US012750290B2

(12) United States Patent
Mayya et al.

(10) Patent No.: US 12,750,290 B2
(45) Date of Patent: Sep. 29, 2026

(54) METHOD AND SYSTEM OF OVERLAY FLOW CONTROL

(71) Applicant: VeloCloud Networks, LLC, Santa Clara, CA (US)

(72) Inventors: Ajit Ramachandra Mayya, Saratoga, CA (US); Parag Pritam Thakore, Los Gatos, CA (US); Stephen Craig Connors, San Jose, CA (US); Steven Michael Woo, Los Altos, CA (US); Sunil Mukundan, Chennai (IN); Thomas Harold Speeter, San Martin, CA (US); Vipin Kumar, Santa Clara, CA (US)

(73) Assignee: VeloCloud Networks, LLC, Santa Clara, CA (US)

( * ) Notice: Subject to any disclaimer, the term of this patent is extended or adjusted under 35 U.S.C. 154(b) by 317 days.

(21) Appl. No.: 18/382,311

(22) Filed: Oct. 20, 2023

(65) Prior Publication Data

US 2024/0048408 A1 Feb. 8, 2024

Related U.S. Application Data

(63) Continuation of application No. 17/361,292, filed on Jun. 28, 2021, now Pat. No. 11,804,988, which is a (Continued)

(51) Int. Cl.
*H04L 41/5041* (2022.01)
*H04L 12/66* (2006.01)
(Continued)

(52) U.S. Cl.
CPC .......... *H04L 41/5041* (2013.01); *H04L 12/66* (2013.01); *H04L 41/5096* (2013.01);
(Continued)

(58) Field of Classification Search
None
See application file for complete search history.

(56) References Cited

U.S. PATENT DOCUMENTS 5,652,751 A 7/1997 Sharony
5,909,553 A 6/1999 Campbell et al.
(Continued)

FOREIGN PATENT DOCUMENTS

CN 1483270 A 3/2004
CN 1926809 A 3/2007
(Continued)

OTHER PUBLICATIONS

Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.

(Continued)

*Primary Examiner* — Saumit Shah
(74) *Attorney, Agent, or Firm* — BainwoodHuang

(57) ABSTRACT

In one aspect, A computerized method of a gateway distributing routes learned through routing protocols (RP) into a Border Gateway Protocol (BGP) includes the step of providing a first gateway that receives a route over a routing protocol. The method includes the step of with the first gateway, redistributing the route to one or more peer routers as a BGP route based on one or more specified criteria. The method includes the step of setting a gateway precedence based on the redistribution of the route to the one or more peer routers as the BGP route. The method includes the step of, based on the gateway precedence, setting a second gateway to automatically redistribute the route with different priorities to influence steering of traffic to a preferred gateway.

12 Claims, 13 Drawing Sheets

Related U.S. Application Data continuation of application No. 16/656,555, filed on Oct. 17, 2019, now Pat. No. 11,050,588, which is a continuation of application No. 15/624,532, filed on Jun. 15, 2017, now Pat. No. 10,454,714, which is a continuation-in-part of application No. 14/321,818, filed on Jul. 2, 2014, now Pat. No. 9,722,815.

(60) Provisional application No. 62/457,816, filed on Feb. 11, 2017, provisional application No. 61/844,822, filed on Jul. 10, 2013.

(51) Int. Cl.

| | |
|---|---|
| ***H04L 41/50*** | (2022.01) |
| ***H04L 43/0894*** | (2022.01) |
| ***H04L 45/02*** | (2022.01) |
| ***H04L 45/03*** | (2022.01) |
| ***H04L 45/033*** | (2022.01) |
| ***H04L 47/24*** | (2022.01) |
| ***H04L 69/325*** | (2022.01) |
| *H04L 12/46* | (2006.01) |
| *H04L 45/50* | (2022.01) |

(52) U.S. Cl.

CPC .......... *H04L 43/0894* (2013.01); *H04L 45/03* (2022.05); *H04L 45/033* (2022.05); *H04L 45/04* (2013.01); *H04L 47/24* (2013.01); *H04L 69/325* (2013.01); *H04L 2012/4629* (2013.01); *H04L 45/50* (2013.01)

(56) References Cited

U.S. PATENT DOCUMENTS

| | | | |
|---|---|---|---|
| 6,154,465 | A | 11/2000 | Pickett |
| 6,157,648 | A | 12/2000 | Voit et al. |
| 6,201,810 | B1 | 3/2001 | Masuda et al. |
| 6,363,378 | B1 | 3/2002 | Conklin et al. |
| 6,445,682 | B1 | 9/2002 | Weitz |
| 6,744,775 | B1 | 6/2004 | Beshai et al. |
| 6,976,087 | B1 | 12/2005 | Westfall et al. |
| 7,003,481 | B2 | 2/2006 | Banka et al. |
| 7,280,476 | B2 | 10/2007 | Anderson |
| 7,313,629 | B1 | 12/2007 | Nucci et al. |
| 7,320,017 | B1 | 1/2008 | Kurapati et al. |
| 7,373,660 | B1 | 5/2008 | Guichard et al. |
| 7,581,022 | B1 | 8/2009 | Griffin et al. |
| 7,680,925 | B2 | 3/2010 | Sathyanarayana et al. |
| 7,681,236 | B2 | 3/2010 | Tamura et al. |
| 7,751,409 | B1 | 7/2010 | Carolan |
| 7,962,458 | B2 | 6/2011 | Holenstein et al. |
| 8,051,185 | B2 | 11/2011 | Lee et al. |
| 8,094,575 | B1 | 1/2012 | Vadlakonda et al. |
| 8,094,659 | B1 | 1/2012 | Arad |
| 8,111,692 | B2 | 2/2012 | Ray |
| 8,141,156 | B1 | 3/2012 | Mao et al. |
| 8,224,971 | B1 | 7/2012 | Miller et al. |
| 8,228,928 | B2 | 7/2012 | Parandekar et al. |
| 8,243,589 | B1 | 8/2012 | Trost et al. |
| 8,259,566 | B2 | 9/2012 | Chen et al. |
| 8,274,891 | B2 | 9/2012 | Averi et al. |
| 8,301,749 | B1 | 10/2012 | Finklestein et al. |
| 8,385,227 | B1 | 2/2013 | Downey |
| 8,516,129 | B1 | 8/2013 | Skene |
| 8,566,452 | B1 | 10/2013 | Goodwin, III et al. |
| 8,588,066 | B2 | 11/2013 | Goel et al. |
| 8,630,291 | B2 | 1/2014 | Shaffer et al. |
| 8,661,295 | B1 | 2/2014 | Khanna et al. |
| 8,724,456 | B1 | 5/2014 | Hong et al. |
| 8,724,503 | B2 | 5/2014 | Johnsson et al. |
| 8,745,177 | B1 | 6/2014 | Kazerani et al. |
| 8,769,129 | B2 | 7/2014 | Watsen et al. |
| 8,797,874 | B2 | 8/2014 | Yu et al. |
| 8,799,504 | B2 | 8/2014 | Capone et al. |
| 8,804,745 | B1 | 8/2014 | Sinn |
| 8,806,482 | B1 | 8/2014 | Nagargadde et al. |
| 8,855,071 | B1 | 10/2014 | Sankaran et al. |
| 8,856,339 | B2 | 10/2014 | Mestery et al. |
| 8,964,548 | B1 | 2/2015 | Keralapura et al. |
| 8,989,199 | B1 | 3/2015 | Sella et al. |
| 9,009,217 | B1 | 4/2015 | Nagargadde et al. |
| 9,015,299 | B1 | 4/2015 | Shah |
| 9,019,837 | B2 | 4/2015 | Lue et al. |
| 9,055,000 | B1 | 6/2015 | Ghosh et al. |
| 9,060,025 | B2 | 6/2015 | Xu |
| 9,071,607 | B2 | 6/2015 | Twitchell, Jr. |
| 9,075,771 | B1 | 7/2015 | Gawali et al. |
| 9,100,329 | B1 | 8/2015 | Jiang et al. |
| 9,135,037 | B1 | 9/2015 | Petrescu-Prahova et al. |
| 9,137,334 | B2 | 9/2015 | Zhou |
| 9,154,327 | B1 | 10/2015 | Marino et al. |
| 9,203,764 | B2 | 12/2015 | Shirazipour et al. |
| 9,225,591 | B2 | 12/2015 | Beheshti-Zavareh et al. |
| 9,258,212 | B2 | 2/2016 | Pfeifer et al. |
| 9,306,949 | B1 | 4/2016 | Richard et al. |
| 9,323,561 | B2 | 4/2016 | Ayala et al. |
| 9,336,040 | B2 | 5/2016 | Dong et al. |
| 9,354,983 | B1 | 5/2016 | Yenamandra et al. |
| 9,356,943 | B1 | 5/2016 | Lopilato et al. |
| 9,379,981 | B1 | 6/2016 | Zhou et al. |
| 9,413,724 | B2 | 8/2016 | Ku |
| 9,419,878 | B2 | 8/2016 | Hsiao et al. |
| 9,432,245 | B1 | 8/2016 | Sorenson, III et al. |
| 9,438,566 | B2 | 9/2016 | Zhang et al. |
| 9,450,817 | B1 | 9/2016 | Bahadur et al. |
| 9,450,852 | B1 | 9/2016 | Chen et al. |
| 9,462,010 | B1 | 10/2016 | Stevenson |
| 9,467,478 | B1 | 10/2016 | Khan et al. |
| 9,485,163 | B1 | 11/2016 | Fries et al. |
| 9,521,067 | B2 | 12/2016 | Michael et al. |
| 9,525,564 | B2 | 12/2016 | Lee |
| 9,542,219 | B1 | 1/2017 | Bryant et al. |
| 9,559,951 | B1 | 1/2017 | Sajassi et al. |
| 9,563,423 | B1 | 2/2017 | Pittman |
| 9,602,389 | B1 | 3/2017 | Maveli et al. |
| 9,608,917 | B1 | 3/2017 | Anderson et al. |
| 9,608,962 | B1 | 3/2017 | Chang |
| 9,614,748 | B1 | 4/2017 | Battersby et al. |
| 9,621,460 | B2 | 4/2017 | Mehta et al. |
| 9,641,551 | B1 | 5/2017 | Kariyanahalli |
| 9,648,547 | B1 | 5/2017 | Hart et al. |
| 9,665,432 | B2 | 5/2017 | Kruse et al. |
| 9,686,127 | B2 | 6/2017 | Ramachandran et al. |
| 9,692,714 | B1 | 6/2017 | Nair et al. |
| 9,715,401 | B2 | 7/2017 | Devine et al. |
| 9,717,021 | B2 | 7/2017 | Hughes et al. |
| 9,722,815 | B2 | 8/2017 | Mukundan et al. |
| 9,747,249 | B2 | 8/2017 | Cherian et al. |
| 9,755,965 | B1 | 9/2017 | Yadav et al. |
| 9,787,559 | B1 | 10/2017 | Schroeder |
| 9,807,004 | B2 | 10/2017 | Koley et al. |
| 9,819,540 | B1 | 11/2017 | Bahadur et al. |
| 9,819,565 | B2 | 11/2017 | Djukic et al. |
| 9,825,822 | B1 | 11/2017 | Holland |
| 9,825,911 | B1 | 11/2017 | Brandwine |
| 9,825,992 | B2 | 11/2017 | Xu |
| 9,832,128 | B1 | 11/2017 | Ashner et al. |
| 9,832,205 | B2 | 11/2017 | Santhi et al. |
| 9,875,355 | B1 | 1/2018 | Williams |
| 9,906,401 | B1 | 2/2018 | Rao |
| 9,923,826 | B2 | 3/2018 | Murgia |
| 9,930,011 | B1 | 3/2018 | Clemons, Jr. et al. |
| 9,935,829 | B1 | 4/2018 | Miller et al. |
| 9,942,787 | B1 | 4/2018 | Tillotson |
| 9,996,370 | B1 | 6/2018 | Khafizov et al. |
| 10,038,601 | B1 | 7/2018 | Becker et al. |
| 10,057,183 | B2 | 8/2018 | Salle et al. |
| 10,057,294 | B2 | 8/2018 | Xu |
| 10,116,593 | B1 | 10/2018 | Sinn et al. |
| 10,135,789 | B2 | 11/2018 | Mayya et al. |
| 10,142,226 | B1 | 11/2018 | Wu et al. |
| 10,178,032 | B1 | 1/2019 | Freitas |
| 10,178,037 | B2 | 1/2019 | Appleby et al. |

(56) References Cited

U.S. PATENT DOCUMENTS 10,187,289 B1 1/2019 Chen et al.
10,200,264 B2 2/2019 Menon et al.
10,229,017 B1 3/2019 Zou et al.
10,237,123 B2 3/2019 Dubey et al.
10,250,498 B1 4/2019 Bales et al.
10,263,832 B1 4/2019 Ghosh
10,263,848 B2 4/2019 Wolting
10,320,664 B2 6/2019 Nainar et al.
10,320,691 B1 6/2019 Matthews et al.
10,326,830 B1 6/2019 Singh
10,348,767 B1 7/2019 Lee et al.
10,355,989 B1 7/2019 Panchal et al.
10,425,382 B2 9/2019 Mayya et al.
10,454,708 B2 10/2019 Mibu
10,454,714 B2 10/2019 Mayya et al.
10,461,993 B2 10/2019 Turabi et al.
10,498,652 B2 12/2019 Mayya et al.
10,511,546 B2 12/2019 Singarayan et al.
10,523,539 B2 12/2019 Mayya et al.
10,550,093 B2 2/2020 Ojima et al.
10,554,538 B2 2/2020 Spohn et al.
10,560,431 B1 2/2020 Chen et al.
10,565,464 B2 2/2020 Han et al.
10,567,519 B1 2/2020 Mukhopadhyaya et al.
10,574,482 B2 2/2020 Oré et al.
10,574,528 B2 2/2020 Mayya et al.
10,594,516 B2 3/2020 Cidon et al.
10,594,591 B2 3/2020 Houjyo et al.
10,594,659 B2 3/2020 El-Moussa et al.
10,608,844 B2 3/2020 Cidon et al.
10,630,505 B2 4/2020 Rubenstein et al.
10,637,889 B2 4/2020 Ermagan et al.
10,666,460 B2 5/2020 Cidon et al.
10,666,497 B2 5/2020 Tahhan et al.
10,686,625 B2 6/2020 Cidon et al.
10,693,739 B1 6/2020 Naseri et al.
10,708,144 B2 7/2020 Mohan et al.
10,715,382 B2 7/2020 Guan et al.
10,715,427 B2 7/2020 Raj et al.
10,749,711 B2 8/2020 Mukundan et al.
10,778,466 B2 9/2020 Cidon et al.
10,778,528 B2 9/2020 Mayya et al.
10,778,557 B2 9/2020 Ganichev et al.
10,805,114 B2 10/2020 Cidon et al.
10,805,272 B2 10/2020 Mayya et al.
10,819,564 B2 10/2020 Turabi et al.
10,826,775 B1 11/2020 Moreno et al.
10,841,131 B2 11/2020 Cidon et al.
10,911,374 B1 2/2021 Kumar et al.
10,924,388 B1 2/2021 Burns et al.
10,938,693 B2 3/2021 Mayya et al.
10,951,529 B2 3/2021 Duan et al.
10,958,479 B2 3/2021 Cidon et al.
10,959,098 B2 3/2021 Cidon et al.
10,992,558 B1 4/2021 Silva et al.
10,992,568 B2 4/2021 Michael et al.
10,999,100 B2 5/2021 Cidon et al.
10,999,137 B2 5/2021 Cidon et al.
10,999,165 B2 5/2021 Cidon et al.
10,999,197 B2 5/2021 Hooda et al.
11,005,684 B2 5/2021 Cidon
11,018,995 B2 5/2021 Cidon et al.
11,044,190 B2 6/2021 Ramaswamy et al.
11,050,588 B2 6/2021 Mayya et al.
11,050,644 B2 6/2021 Jegde et al.
11,071,005 B2 7/2021 Shen et al.
11,089,111 B2 8/2021 Markuze et al.
11,095,612 B1 8/2021 Oswal et al.
11,102,032 B2 8/2021 Cidon et al.
11,108,595 B2 8/2021 Knutsen et al.
11,108,851 B1 8/2021 Kurmala et al.
11,115,347 B2 9/2021 Gupta et al.
11,115,426 B1 9/2021 Pazhyannur et al.
11,115,480 B2 9/2021 Markuze et al.
11,121,962 B2 9/2021 Michael et al.
11,121,985 B2 9/2021 Cidon et al.
11,128,492 B2 9/2021 Sethi et al.
11,146,632 B2 10/2021 Rubenstein
11,153,230 B2 10/2021 Cidon et al.
11,171,885 B2 11/2021 Cidon et al.
11,212,140 B2 12/2021 Mukundan et al.
11,212,238 B2 12/2021 Cidon et al.
11,223,514 B2 1/2022 Mayya et al.
11,245,641 B2 2/2022 Ramaswamy et al.
11,252,079 B2 2/2022 Michael et al.
11,252,105 B2 2/2022 Cidon et al.
11,252,106 B2 2/2022 Cidon et al.
11,258,728 B2 2/2022 Cidon et al.
11,310,170 B2 4/2022 Cidon et al.
11,323,307 B2 5/2022 Mayya et al.
11,349,722 B2 5/2022 Mayya et al.
11,363,124 B2 6/2022 Markuze et al.
11,374,904 B2 6/2022 Mayya et al.
11,375,005 B1 6/2022 Rolando et al.
11,381,474 B1 7/2022 Kumar et al.
11,381,499 B1 7/2022 Ramaswamy et al.
11,388,086 B1 7/2022 Ramaswamy et al.
11,394,640 B2 7/2022 Ramaswamy et al.
11,418,997 B2 8/2022 Devadoss et al.
11,438,789 B2 9/2022 Devadoss et al.
11,444,865 B2 9/2022 Ramaswamy et al.
11,444,872 B2 9/2022 Mayya et al.
11,477,127 B2 10/2022 Ramaswamy et al.
11,489,720 B1 11/2022 Kempanna et al.
11,489,783 B2 11/2022 Ramaswamy et al.
11,502,936 B2 11/2022 Tootaghaj et al.
11,509,571 B1 11/2022 Ramaswamy et al.
11,516,049 B2 11/2022 Cidon et al.
11,522,780 B1 12/2022 Wallace et al.
11,526,434 B1 12/2022 Brooker et al.
11,533,248 B2 12/2022 Mayya et al.
11,552,874 B1 1/2023 Pragada et al.
11,575,591 B2 2/2023 Ramaswamy et al.
11,575,600 B2 2/2023 Markuze et al.
11,582,144 B2 2/2023 Ramaswamy et al.
11,582,298 B2 2/2023 Hood et al.
11,601,356 B2 3/2023 Gandhi et al.
11,606,225 B2 3/2023 Cidon et al.
11,606,286 B2 3/2023 Michael et al.
11,606,314 B2 3/2023 Cidon et al.
11,606,712 B2 3/2023 Devadoss et al.
11,611,507 B2 3/2023 Ramaswamy et al.
11,637,768 B2 4/2023 Ramaswamy et al.
11,677,720 B2 6/2023 Mayya et al.
11,689,959 B2 6/2023 Devadoss et al.
11,700,196 B2 7/2023 Michael et al.
11,706,126 B2 7/2023 Silva et al.
11,706,127 B2 7/2023 Michael et al.
11,709,710 B2 7/2023 Markuze et al.
11,716,286 B2 8/2023 Ramaswamy et al.
11,722,925 B2 8/2023 Devadoss et al.
11,729,065 B2 8/2023 Ramaswamy et al.
11,792,127 B2 10/2023 Ramaswamy et al.
2002/0049687 A1 4/2002 Helsper et al.
2002/0075542 A1 6/2002 Kumar et al.
2002/0085488 A1 7/2002 Kobayashi
2002/0087716 A1 7/2002 Mustafa
2002/0152306 A1 10/2002 Tuck
2002/0186682 A1 12/2002 Kawano et al.
2002/0198840 A1 12/2002 Banka et al.
2003/0050061 A1 3/2003 Wu et al.
2003/0061269 A1 3/2003 Hathaway et al.
2003/0088697 A1 5/2003 Matsuhira
2003/0112766 A1 6/2003 Riedel et al.
2003/0112808 A1 6/2003 Solomon
2003/0126468 A1 7/2003 Markham
2003/0161313 A1 8/2003 Jinmei et al.
2003/0161321 A1 8/2003 Karam et al.
2003/0189919 A1 10/2003 Gupta et al.
2003/0202506 A1 10/2003 Perkins et al.
2003/0219030 A1 11/2003 Gubbi
2004/0059831 A1 3/2004 Chu et al.
2004/0068668 A1 4/2004 Lor et al.
2004/0165601 A1 8/2004 Liu et al.

(56) References Cited

U.S. PATENT DOCUMENTS

2004/0224771 A1 11/2004 Chen et al.
2005/0078690 A1 4/2005 DeLangis
2005/0149604 A1 7/2005 Navada
2005/0154790 A1 7/2005 Nagata et al.
2005/0172161 A1 8/2005 Cruz et al.
2005/0195754 A1 9/2005 Nosella
2005/0210479 A1 9/2005 Andjelic
2005/0265255 A1 12/2005 Kodialam et al.
2006/0002291 A1 1/2006 Alicherry et al.
2006/0034335 A1 2/2006 Karaoguz et al.
2006/0114838 A1 6/2006 Mandavilli et al.
2006/0171365 A1 8/2006 Borella
2006/0182034 A1 8/2006 Klinker et al.
2006/0182035 A1 8/2006 Vasseur
2006/0193247 A1 8/2006 Naseh et al.
2006/0193252 A1 8/2006 Naseh et al.
2006/0195605 A1 8/2006 Sundarrajan et al.
2006/0245414 A1 11/2006 Susai et al.
2007/0050594 A1 3/2007 Augsburg et al.
2007/0064604 A1 3/2007 Chen et al.
2007/0064702 A1 3/2007 Bates et al.
2007/0083727 A1 4/2007 Johnston et al.
2007/0091794 A1 4/2007 Filsfils et al.
2007/0103548 A1 5/2007 Carter
2007/0115812 A1 5/2007 Hughes
2007/0121486 A1 5/2007 Guichard et al.
2007/0130325 A1 6/2007 Lesser
2007/0162619 A1 7/2007 Aloni et al.
2007/0162639 A1 7/2007 Chu et al.
2007/0177511 A1 8/2007 Das et al.
2007/0195797 A1 8/2007 Patel et al.
2007/0237081 A1 10/2007 Kodialam et al.
2007/0260746 A1 11/2007 Mirtorabi et al.
2007/0268882 A1 11/2007 Breslau et al.
2008/0002670 A1 1/2008 Bugenhagen et al.
2008/0049621 A1 2/2008 McGuire et al.
2008/0055241 A1 3/2008 Goldenberg et al.
2008/0080509 A1 4/2008 Khanna et al.
2008/0095187 A1 4/2008 Jung et al.
2008/0117930 A1 5/2008 Chakareski et al.
2008/0144532 A1 6/2008 Chamarajanagar et al.
2008/0168086 A1 7/2008 Miller et al.
2008/0175150 A1 7/2008 Bolt et al.
2008/0181116 A1 7/2008 Kavanaugh et al.
2008/0219276 A1 9/2008 Shah
2008/0240121 A1 10/2008 Xiong et al.
2008/0263218 A1 10/2008 Beerends et al.
2009/0013210 A1 1/2009 McIntosh et al.
2009/0028092 A1 1/2009 Rothschild
2009/0125617 A1 5/2009 Klessig et al.
2009/0141642 A1 6/2009 Sun
2009/0154463 A1 6/2009 Hines et al.
2009/0182874 A1 7/2009 Morford et al.
2009/0247204 A1 10/2009 Sennett et al.
2009/0268605 A1 10/2009 Campbell et al.
2009/0274045 A1 11/2009 Meier et al.
2009/0276657 A1 11/2009 Wetmore et al.
2009/0303880 A1 12/2009 Maltz et al.
2010/0008361 A1 1/2010 Guichard et al.
2010/0017802 A1 1/2010 Lojewski
2010/0046532 A1 2/2010 Okita
2010/0061379 A1 3/2010 Parandekar et al.
2010/0080129 A1 4/2010 Strahan et al.
2010/0088440 A1 4/2010 Banks et al.
2010/0091782 A1 4/2010 Hiscock
2010/0091823 A1 4/2010 Retana et al.
2010/0098092 A1 4/2010 Luo et al.
2010/0100768 A1 4/2010 Yamamoto et al.
2010/0107162 A1 4/2010 Edwards et al.
2010/0118727 A1 5/2010 Draves et al.
2010/0118886 A1 5/2010 Saavedra
2010/0128600 A1 5/2010 Srinivasmurthy et al.
2010/0165985 A1 7/2010 Sharma et al.
2010/0191884 A1 7/2010 Holenstein et al.
2010/0223621 A1 9/2010 Joshi et al.
2010/0226246 A1 9/2010 Proulx
2010/0290422 A1 11/2010 Haigh et al.
2010/0309841 A1 12/2010 Conte
2010/0309912 A1 12/2010 Mehta et al.
2010/0322255 A1 12/2010 Hao et al.
2010/0332657 A1 12/2010 Elyashev et al.
2011/0001604 A1 1/2011 Ludlow et al.
2011/0007752 A1 1/2011 Silva et al.
2011/0032939 A1 2/2011 Nozaki et al.
2011/0035187 A1 2/2011 DeJori et al.
2011/0040814 A1 2/2011 Higgins
2011/0075674 A1 3/2011 Li et al.
2011/0078783 A1 3/2011 Duan et al.
2011/0107139 A1 5/2011 Middlecamp et al.
2011/0110370 A1 5/2011 Moreno et al.
2011/0141877 A1 6/2011 Xu et al.
2011/0142041 A1 6/2011 Mai
2011/0153909 A1 6/2011 Dong
2011/0235509 A1 9/2011 Szymanski
2011/0255397 A1 10/2011 Kadakia et al.
2011/0302663 A1 12/2011 Prodan et al.
2012/0008630 A1 1/2012 Ould-Brahim
2012/0027013 A1 2/2012 Napierala
2012/0039309 A1 2/2012 Evans et al.
2012/0069847 A1 * 3/2012 Saad ...................... H04L 45/04 370/392
2012/0099601 A1 4/2012 Haddad et al.
2012/0136697 A1 5/2012 Peles et al.
2012/0140935 A1 6/2012 Kruglick
2012/0157068 A1 6/2012 Eichen et al.
2012/0173694 A1 7/2012 Yan et al.
2012/0173919 A1 7/2012 Patel et al.
2012/0182940 A1 7/2012 Taleb et al.
2012/0221955 A1 8/2012 Raleigh et al.
2012/0227093 A1 9/2012 Shatzkamer et al.
2012/0240185 A1 9/2012 Kapoor et al.
2012/0250682 A1 10/2012 Vincent et al.
2012/0250686 A1 10/2012 Vincent et al.
2012/0266026 A1 10/2012 Chikkalingaiah et al.
2012/0281706 A1 11/2012 Agarwal et al.
2012/0287818 A1 11/2012 Corti et al.
2012/0300615 A1 11/2012 Kempf et al.
2012/0307659 A1 12/2012 Yamada
2012/0317270 A1 12/2012 Vrbaski et al.
2012/0317291 A1 12/2012 Wolfe
2013/0007505 A1 1/2013 Spear
2013/0019005 A1 1/2013 Hui et al.
2013/0021968 A1 1/2013 Reznik et al.
2013/0044764 A1 2/2013 Casado et al.
2013/0051237 A1 2/2013 Ong
2013/0051399 A1 2/2013 Zhang et al.
2013/0054763 A1 2/2013 Merwe et al.
2013/0086267 A1 4/2013 Gelenbe et al.
2013/0097304 A1 4/2013 Asthana et al.
2013/0103729 A1 4/2013 Cooney et al.
2013/0103834 A1 4/2013 Dzerve et al.
2013/0117530 A1 5/2013 Kim et al.
2013/0124718 A1 5/2013 Griffith et al.
2013/0124911 A1 5/2013 Griffith et al.
2013/0124912 A1 5/2013 Griffith et al.
2013/0128757 A1 5/2013 Chowdhary et al.
2013/0128889 A1 5/2013 Mathur et al.
2013/0142201 A1 6/2013 Kim et al.
2013/0170354 A1 7/2013 Takashima et al.
2013/0173768 A1 7/2013 Kundu et al.
2013/0173788 A1 7/2013 Song
2013/0182712 A1 7/2013 Aguayo et al.
2013/0185446 A1 7/2013 Zeng et al.
2013/0185729 A1 7/2013 Vasic et al.
2013/0191688 A1 7/2013 Agarwal et al.
2013/0223226 A1 8/2013 Narayanan et al.
2013/0223454 A1 8/2013 Dunbar et al.
2013/0235870 A1 9/2013 Tripathi et al.
2013/0238782 A1 9/2013 Zhao et al.
2013/0242718 A1 9/2013 Zhang
2013/0254599 A1 9/2013 Katkar et al.
2013/0258839 A1 10/2013 Wang et al.
2013/0258847 A1 10/2013 Zhang et al.
2013/0258939 A1 10/2013 Wang

(56) References Cited

U.S. PATENT DOCUMENTS

2013/0266015 A1 10/2013 Qu et al.
2013/0266019 A1 10/2013 Qu et al.
2013/0283364 A1 10/2013 Chang et al.
2013/0286846 A1 10/2013 Atlas et al.
2013/0297611 A1 11/2013 Moritz et al.
2013/0297770 A1 11/2013 Zhang
2013/0301469 A1 11/2013 Suga
2013/0301642 A1 11/2013 Radhakrishnan et al.
2013/0308444 A1 11/2013 Sem-Jacobsen et al.
2013/0315242 A1 11/2013 Wang et al.
2013/0315243 A1 11/2013 Huang et al.
2013/0329548 A1 12/2013 Nakil et al.
2013/0329601 A1 12/2013 Yin et al.
2013/0329734 A1 12/2013 Chesla et al.
2013/0346470 A1 12/2013 Obstfeld et al.
2014/0016464 A1 1/2014 Shirazipour et al.
2014/0019604 A1 1/2014 Twitchell, Jr.
2014/0019750 A1 1/2014 Dodgson et al.
2014/0040975 A1 2/2014 Raleigh et al.
2014/0064283 A1 3/2014 Balus et al.
2014/0071832 A1 3/2014 Johnsson et al.
2014/0092907 A1 4/2014 Sridhar et al.
2014/0108665 A1 4/2014 Arora et al.
2014/0112171 A1 4/2014 Pasdar
2014/0115584 A1 4/2014 Mudigonda et al.
2014/0122559 A1 5/2014 Branson et al.
2014/0123135 A1 5/2014 Huang et al.
2014/0126418 A1 5/2014 Brendel et al.
2014/0156818 A1 6/2014 Hunt
2014/0156823 A1 6/2014 Liu et al.
2014/0157363 A1 6/2014 Banerjee
2014/0160935 A1 6/2014 Zecharia et al.
2014/0164560 A1 6/2014 Ko et al.
2014/0164617 A1 6/2014 Jalan et al.
2014/0164718 A1 6/2014 Schaik et al.
2014/0173113 A1 6/2014 Vemuri et al.
2014/0173331 A1 6/2014 Martin et al.
2014/0181824 A1 6/2014 Saund et al.
2014/0189074 A1 7/2014 Parker
2014/0198794 A1* 7/2014 Mehta .................... H04L 69/16
370/392
2014/0201642 A1 7/2014 Vicat-Blanc
2014/0208317 A1 7/2014 Nakagawa
2014/0219135 A1 8/2014 Li et al.
2014/0223507 A1 8/2014 Xu
2014/0226664 A1 8/2014 Chen et al.
2014/0229210 A1 8/2014 Sharifian et al.
2014/0233564 A1 8/2014 Ue et al.
2014/0244851 A1 8/2014 Lee
2014/0258535 A1 9/2014 Zhang
2014/0269690 A1 9/2014 Tu
2014/0279862 A1 9/2014 Dietz et al.
2014/0280499 A1 9/2014 Basavaiah et al.
2014/0310282 A1 10/2014 Sprague et al.
2014/0317440 A1 10/2014 Biermayr et al.
2014/0321277 A1 10/2014 Lynn, Jr. et al.
2014/0337500 A1 11/2014 Lee
2014/0337674 A1 11/2014 Ivancic et al.
2014/0341109 A1 11/2014 Cartmell et al.
2014/0351394 A1 11/2014 Elisha
2014/0355441 A1 12/2014 Jain
2014/0365834 A1 12/2014 Stone et al.
2014/0372582 A1 12/2014 Ghanwani et al.
2015/0003240 A1 1/2015 Drwiega et al.
2015/0016249 A1 1/2015 Mukundan et al.
2015/0029864 A1 1/2015 Raileanu et al.
2015/0039744 A1 2/2015 Niazi et al.
2015/0046572 A1 2/2015 Cheng et al.
2015/0052247 A1 2/2015 Threefoot et al.
2015/0052517 A1 2/2015 Raghu et al.
2015/0056960 A1 2/2015 Egner et al.
2015/0058917 A1 2/2015 Xu
2015/0088942 A1 3/2015 Shah
2015/0089628 A1 3/2015 Lang
2015/0092603 A1 4/2015 Aguayo et al.
2015/0096011 A1 4/2015 Watt
2015/0100958 A1 4/2015 Banavalikar et al.
2015/0106809 A1 4/2015 Reddy et al.
2015/0124603 A1 5/2015 Ketheesan et al.
2015/0134777 A1 5/2015 Onoue
2015/0139238 A1 5/2015 Pourzandi et al.
2015/0146539 A1 5/2015 Mehta et al.
2015/0163152 A1 6/2015 Li
2015/0169340 A1 6/2015 Haddad et al.
2015/0172121 A1 6/2015 Farkas et al.
2015/0172169 A1 6/2015 DeCusatis et al.
2015/0188823 A1 7/2015 Williams et al.
2015/0189009 A1 7/2015 Bemmel
2015/0195178 A1 7/2015 Bhattacharya et al.
2015/0201036 A1 7/2015 Nishiki et al.
2015/0222543 A1 8/2015 Song
2015/0222638 A1 8/2015 Morley
2015/0236945 A1 8/2015 Michael et al.
2015/0236962 A1 8/2015 Veres et al.
2015/0244617 A1 8/2015 Nakil et al.
2015/0249644 A1 9/2015 Xu
2015/0257081 A1 9/2015 Ramanujan et al.
2015/0264055 A1 9/2015 Budhani et al.
2015/0271056 A1 9/2015 Chunduri et al.
2015/0271104 A1 9/2015 Chikkamath et al.
2015/0271303 A1 9/2015 Neginhal et al.
2015/0281004 A1 10/2015 Kakadia et al.
2015/0312142 A1 10/2015 Barabash et al.
2015/0312760 A1 10/2015 O'Toole
2015/0317169 A1 11/2015 Sinha et al.
2015/0319057 A1 11/2015 Jocha et al.
2015/0326426 A1 11/2015 Luo et al.
2015/0334025 A1 11/2015 Rader
2015/0334696 A1 11/2015 Gu et al.
2015/0341271 A1 11/2015 Gomez
2015/0349978 A1 12/2015 Wu et al.
2015/0350907 A1 12/2015 Timariu et al.
2015/0358232 A1 12/2015 Chen et al.
2015/0358236 A1 12/2015 Roach et al.
2015/0363221 A1 12/2015 Terayama et al.
2015/0363733 A1 12/2015 Brown
2015/0365323 A1 12/2015 Duminuco et al.
2015/0372943 A1 12/2015 Hasan et al.
2015/0372982 A1 12/2015 Herle et al.
2015/0381407 A1 12/2015 Wang et al.
2015/0381462 A1 12/2015 Choi et al.
2015/0381493 A1 12/2015 Bansal et al.
2016/0019317 A1 1/2016 Pawar et al.
2016/0020844 A1 1/2016 Hart et al.
2016/0021597 A1 1/2016 Hart et al.
2016/0035183 A1 2/2016 Buchholz et al.
2016/0036924 A1 2/2016 Koppolu et al.
2016/0036938 A1 2/2016 Aviles et al.
2016/0037434 A1 2/2016 Gopal et al.
2016/0072669 A1 3/2016 Saavedra
2016/0072684 A1 3/2016 Manuguri et al.
2016/0080268 A1 3/2016 Anand et al.
2016/0080502 A1 3/2016 Yadav et al.
2016/0105353 A1 4/2016 Cociglio
2016/0105392 A1 4/2016 Thakkar et al.
2016/0105471 A1 4/2016 Nunes et al.
2016/0105488 A1 4/2016 Thakkar et al.
2016/0117185 A1 4/2016 Fang et al.
2016/0134461 A1 5/2016 Sampath et al.
2016/0134527 A1 5/2016 Kwak et al.
2016/0134528 A1 5/2016 Lin et al.
2016/0134591 A1 5/2016 Liao et al.
2016/0142373 A1 5/2016 Ossipov
2016/0147607 A1 5/2016 Dornemann et al.
2016/0150055 A1 5/2016 Choi
2016/0164832 A1 6/2016 Bellagamba et al.
2016/0164914 A1 6/2016 Madhav et al.
2016/0173338 A1 6/2016 Wolting
2016/0191363 A1 6/2016 Haraszti et al.
2016/0191374 A1 6/2016 Singh et al.
2016/0192403 A1 6/2016 Gupta et al.
2016/0197834 A1 7/2016 Luft
2016/0197835 A1 7/2016 Luft
2016/0198003 A1 7/2016 Luft

(56) References Cited

U.S. PATENT DOCUMENTS

2016/0205071 A1 7/2016 Cooper et al.
2016/0210209 A1 7/2016 Verkaik et al.
2016/0212773 A1 7/2016 Kanderholm et al.
2016/0218947 A1 7/2016 Hughes et al.
2016/0218951 A1 7/2016 Vasseur et al.
2016/0234099 A1 8/2016 Jiao
2016/0234161 A1 8/2016 Banerjee et al.
2016/0255169 A1 9/2016 Kovvuri et al.
2016/0255542 A1 9/2016 Hughes et al.
2016/0261493 A1 9/2016 Li
2016/0261495 A1 9/2016 Xia et al.
2016/0261506 A1 9/2016 Hegde et al.
2016/0261639 A1 9/2016 Xu
2016/0269298 A1 9/2016 Li et al.
2016/0269926 A1 9/2016 Sundaram
2016/0285736 A1 9/2016 Gu
2016/0299775 A1 10/2016 Madapurath et al.
2016/0301471 A1 10/2016 Kunz et al.
2016/0308762 A1 10/2016 Teng et al.
2016/0315912 A1 10/2016 Mayya et al.
2016/0323377 A1 11/2016 Einkauf et al.
2016/0328159 A1 11/2016 Coddington et al.
2016/0330111 A1 11/2016 Manghirmalani et al.
2016/0337202 A1 11/2016 Ben-Itzhak et al.
2016/0352588 A1 12/2016 Subbarayan et al.
2016/0353268 A1 12/2016 Senarath et al.
2016/0359738 A1 12/2016 Sullenberger et al.
2016/0366187 A1 12/2016 Kamble
2016/0371153 A1 12/2016 Dornemann
2016/0378527 A1 12/2016 Zamir
2016/0380886 A1 12/2016 Blair et al.
2016/0380906 A1 12/2016 Hodique et al.
2017/0005986 A1 1/2017 Bansal et al.
2017/0006499 A1 1/2017 Hampel et al.
2017/0012870 A1 1/2017 Blair et al.
2017/0019428 A1 1/2017 Cohn
2017/0024260 A1 1/2017 Chandrasekaran et al.
2017/0026273 A1 1/2017 Yao et al.
2017/0026283 A1 1/2017 Williams et al.
2017/0026355 A1 1/2017 Mathaiyan et al.
2017/0034046 A1 2/2017 Cai et al.
2017/0034052 A1 2/2017 Chanda et al.
2017/0034129 A1 2/2017 Sawant et al.
2017/0048296 A1 2/2017 Ramalho et al.
2017/0053258 A1 2/2017 Carney et al.
2017/0055131 A1 2/2017 Kong et al.
2017/0063674 A1 3/2017 Maskalik et al.
2017/0063782 A1 3/2017 Jain et al.
2017/0063783 A1 3/2017 Yong et al.
2017/0063794 A1 3/2017 Jain et al.
2017/0064005 A1 3/2017 Lee
2017/0075710 A1 3/2017 Prasad et al.
2017/0093625 A1 3/2017 Pera et al.
2017/0093794 A1* 3/2017 Natu .................. H04L 12/4641
2017/0097841 A1 4/2017 Chang et al.
2017/0104653 A1 4/2017 Badea et al.
2017/0104755 A1 4/2017 Arregoces et al.
2017/0109212 A1 4/2017 Gaurav et al.
2017/0111246 A1 4/2017 Shaw et al.
2017/0118067 A1 4/2017 Vedula
2017/0118173 A1 4/2017 Arramreddy et al.
2017/0123939 A1 5/2017 Maheshwari et al.
2017/0126475 A1 5/2017 Mahkonen et al.
2017/0126516 A1 5/2017 Tiagi et al.
2017/0126564 A1 5/2017 Mayya et al.
2017/0134186 A1 5/2017 Mukundan et al.
2017/0134520 A1 5/2017 Abbasi et al.
2017/0139789 A1 5/2017 Fries et al.
2017/0142000 A1 5/2017 Cai et al.
2017/0149637 A1 5/2017 Banikazemi et al.
2017/0155557 A1 6/2017 Desai et al.
2017/0155566 A1 6/2017 Martinsen et al.
2017/0155590 A1 6/2017 Dillon et al.
2017/0163473 A1 6/2017 Sadana et al.
2017/0171024 A1 6/2017 Anerousis et al.
2017/0171310 A1 6/2017 Gardner
2017/0180220 A1 6/2017 Eckey et al.
2017/0181210 A1 6/2017 Nadella et al.
2017/0195161 A1 7/2017 Ruel et al.
2017/0195169 A1 7/2017 Mills et al.
2017/0201568 A1 7/2017 Hussam et al.
2017/0201585 A1 7/2017 Doraiswamy et al.
2017/0207976 A1 7/2017 Rovner et al.
2017/0214545 A1 7/2017 Cheng et al.
2017/0214701 A1 7/2017 Hasan
2017/0223117 A1 8/2017 Messerli et al.
2017/0236060 A1 8/2017 Ignatyev
2017/0237710 A1 8/2017 Mayya et al.
2017/0242784 A1 8/2017 Heorhiadi et al.
2017/0257260 A1 9/2017 Govindan et al.
2017/0257309 A1 9/2017 Appanna
2017/0264496 A1 9/2017 Ao et al.
2017/0279717 A1 9/2017 Bethers et al.
2017/0279741 A1 9/2017 Elias et al.
2017/0279803 A1 9/2017 Desai et al.
2017/0280474 A1 9/2017 Vesterinen et al.
2017/0288987 A1 10/2017 Pasupathy et al.
2017/0289002 A1 10/2017 Ganguli et al.
2017/0289027 A1 10/2017 Ratnasingham
2017/0295264 A1 10/2017 Touitou et al.
2017/0302501 A1 10/2017 Shi et al.
2017/0302565 A1 10/2017 Ghobadi et al.
2017/0310641 A1 10/2017 Jiang et al.
2017/0310691 A1 10/2017 Vasseur et al.
2017/0317945 A1 11/2017 Guo et al.
2017/0317954 A1 11/2017 Masurekar et al.
2017/0317969 A1 11/2017 Masurekar et al.
2017/0317974 A1 11/2017 Masurekar et al.
2017/0324628 A1 11/2017 Dhanabalan
2017/0337086 A1 11/2017 Zhu et al.
2017/0339022 A1 11/2017 Hegde et al.
2017/0339054 A1 11/2017 Yadav et al.
2017/0339070 A1 11/2017 Chang et al.
2017/0346722 A1 11/2017 Smith et al.
2017/0364419 A1 12/2017 Lo
2017/0366445 A1 12/2017 Nemirovsky et al.
2017/0366467 A1 12/2017 Martin et al.
2017/0373950 A1 12/2017 Szilagyi et al.
2017/0374174 A1 12/2017 Evens et al.
2018/0006995 A1 1/2018 Bickhart et al.
2018/0007005 A1 1/2018 Chanda et al.
2018/0007123 A1 1/2018 Cheng et al.
2018/0013636 A1 1/2018 Seetharamaiah et al.
2018/0014051 A1 1/2018 Phillips et al.
2018/0019952 A1* 1/2018 Li ........................ H04L 69/161
2018/0020035 A1 1/2018 Boggia et al.
2018/0034668 A1 2/2018 Mayya et al.
2018/0041425 A1 2/2018 Zhang
2018/0041470 A1 2/2018 Schultz et al.
2018/0062875 A1 3/2018 Tumuluru
2018/0062914 A1 3/2018 Boutros et al.
2018/0062917 A1 3/2018 Chandrashekhar et al.
2018/0063036 A1 3/2018 Chandrashekhar et al.
2018/0063193 A1 3/2018 Chandrashekhar et al.
2018/0063233 A1 3/2018 Park
2018/0063743 A1 3/2018 Tumuluru et al.
2018/0069924 A1 3/2018 Tumuluru et al.
2018/0074909 A1 3/2018 Bishop et al.
2018/0077081 A1 3/2018 Lauer et al.
2018/0077202 A1 3/2018 Xu
2018/0084081 A1 3/2018 Kuchibhotla et al.
2018/0091370 A1 3/2018 Arai
2018/0097725 A1 4/2018 Wood et al.
2018/0114569 A1 4/2018 Strachan et al.
2018/0123910 A1 5/2018 Fitzgibbon
2018/0123946 A1 5/2018 Ramachandran et al.
2018/0131608 A1 5/2018 Jiang et al.
2018/0131615 A1 5/2018 Zhang
2018/0131720 A1 5/2018 Hobson et al.
2018/0145899 A1 5/2018 Rao
2018/0159796 A1 6/2018 Wang et al.
2018/0159856 A1 6/2018 Gujarathi
2018/0167378 A1 6/2018 Kostyukov et al.
2018/0176073 A1 6/2018 Dubey et al.

(56) References Cited

U.S. PATENT DOCUMENTS

| | | | |
|---|---|---|---|
| 2018/0176082 | A1 | 6/2018 | Katz et al. |
| 2018/0176130 | A1 | 6/2018 | Banerjee et al. |
| 2018/0176252 | A1 | 6/2018 | Nimmagadda et al. |
| 2018/0181423 | A1 | 6/2018 | Gunda et al. |
| 2018/0205746 | A1 | 7/2018 | Boutnaru et al. |
| 2018/0213472 | A1 | 7/2018 | Ishii et al. |
| 2018/0219765 | A1 | 8/2018 | Michael et al. |
| 2018/0219766 | A1 | 8/2018 | Michael et al. |
| 2018/0234300 | A1 | 8/2018 | Mayya et al. |
| 2018/0248790 | A1 | 8/2018 | Tan et al. |
| 2018/0260125 | A1 | 9/2018 | Botes et al. |
| 2018/0261085 | A1 | 9/2018 | Liu et al. |
| 2018/0262468 | A1 | 9/2018 | Kumar et al. |
| 2018/0270104 | A1 | 9/2018 | Zheng et al. |
| 2018/0278541 | A1 | 9/2018 | Wu et al. |
| 2018/0287907 | A1 | 10/2018 | Kulshreshtha et al. |
| 2018/0295101 | A1 | 10/2018 | Gehrmann |
| 2018/0295529 | A1 | 10/2018 | Jen et al. |
| 2018/0302286 | A1 | 10/2018 | Mayya et al. |
| 2018/0302321 | A1 | 10/2018 | Manthiramoorthy et al. |
| 2018/0307851 | A1 | 10/2018 | Lewis |
| 2018/0316606 | A1 | 11/2018 | Sung et al. |
| 2018/0351855 | A1 | 12/2018 | Sood et al. |
| 2018/0351862 | A1 | 12/2018 | Jeganathan et al. |
| 2018/0351863 | A1 | 12/2018 | Vairavakkalai et al. |
| 2018/0351882 | A1 | 12/2018 | Jeganathan et al. |
| 2018/0359323 | A1 | 12/2018 | Madden |
| 2018/0367445 | A1 | 12/2018 | Bajaj |
| 2018/0373558 | A1 | 12/2018 | Chang et al. |
| 2018/0375744 | A1 | 12/2018 | Mayya et al. |
| 2018/0375824 | A1 | 12/2018 | Mayya et al. |
| 2018/0375967 | A1 | 12/2018 | Pithawala et al. |
| 2019/0013883 | A1 | 1/2019 | Vargas et al. |
| 2019/0014038 | A1 | 1/2019 | Ritchie |
| 2019/0020588 | A1 | 1/2019 | Twitchell, Jr. |
| 2019/0020627 | A1 | 1/2019 | Yuan |
| 2019/0021085 | A1 | 1/2019 | Mochizuki et al. |
| 2019/0028378 | A1 | 1/2019 | Houjyo et al. |
| 2019/0028552 | A1 | 1/2019 | Johnson et al. |
| 2019/0036808 | A1 | 1/2019 | Shenoy et al. |
| 2019/0036810 | A1 | 1/2019 | Michael et al. |
| 2019/0036813 | A1 | 1/2019 | Shenoy et al. |
| 2019/0046056 | A1 | 2/2019 | Khachaturian et al. |
| 2019/0058657 | A1 | 2/2019 | Chunduri et al. |
| 2019/0058709 | A1 | 2/2019 | Kempf et al. |
| 2019/0068470 | A1 | 2/2019 | Mirsky |
| 2019/0068493 | A1 | 2/2019 | Ram et al. |
| 2019/0068500 | A1 | 2/2019 | Hira |
| 2019/0075083 | A1 | 3/2019 | Mayya et al. |
| 2019/0081894 | A1 | 3/2019 | Yousaf et al. |
| 2019/0103990 | A1 | 4/2019 | Cidon et al. |
| 2019/0103991 | A1 | 4/2019 | Cidon et al. |
| 2019/0103992 | A1 | 4/2019 | Cidon et al. |
| 2019/0103993 | A1 | 4/2019 | Cidon et al. |
| 2019/0104035 | A1 | 4/2019 | Cidon et al. |
| 2019/0104049 | A1 | 4/2019 | Cidon et al. |
| 2019/0104050 | A1 | 4/2019 | Cidon et al. |
| 2019/0104051 | A1 | 4/2019 | Cidon et al. |
| 2019/0104052 | A1 | 4/2019 | Cidon et al. |
| 2019/0104053 | A1 | 4/2019 | Cidon et al. |
| 2019/0104063 | A1 | 4/2019 | Cidon et al. |
| 2019/0104064 | A1 | 4/2019 | Cidon et al. |
| 2019/0104109 | A1 | 4/2019 | Cidon et al. |
| 2019/0104111 | A1 | 4/2019 | Cidon et al. |
| 2019/0104413 | A1 | 4/2019 | Cidon et al. |
| 2019/0109769 | A1 | 4/2019 | Jain et al. |
| 2019/0132221 | A1 | 5/2019 | Boutros et al. |
| 2019/0132234 | A1 | 5/2019 | Dong et al. |
| 2019/0132322 | A1 | 5/2019 | Song et al. |
| 2019/0140889 | A1 | 5/2019 | Mayya et al. |
| 2019/0140890 | A1 | 5/2019 | Mayya et al. |
| 2019/0149525 | A1 | 5/2019 | Gunda et al. |
| 2019/0158371 | A1 | 5/2019 | Dillon et al. |
| 2019/0158605 | A1 | 5/2019 | Markuze et al. |
| 2019/0199539 | A1 | 6/2019 | Deng et al. |
| 2019/0220703 | A1 | 7/2019 | Prakash et al. |
| 2019/0222499 | A1 | 7/2019 | Chen et al. |
| 2019/0238364 | A1 | 8/2019 | Boutros et al. |
| 2019/0238446 | A1 | 8/2019 | Barzik et al. |
| 2019/0238449 | A1 | 8/2019 | Michael et al. |
| 2019/0238450 | A1 | 8/2019 | Michael et al. |
| 2019/0238483 | A1 | 8/2019 | Marichetty et al. |
| 2019/0238497 | A1 | 8/2019 | Tourrilhes et al. |
| 2019/0268421 | A1 | 8/2019 | Markuze et al. |
| 2019/0268973 | A1 | 8/2019 | Bull et al. |
| 2019/0278631 | A1 | 9/2019 | Bernat et al. |
| 2019/0280962 | A1 | 9/2019 | Michael et al. |
| 2019/0280963 | A1 | 9/2019 | Michael et al. |
| 2019/0280964 | A1 | 9/2019 | Michael et al. |
| 2019/0288875 | A1 | 9/2019 | Shen et al. |
| 2019/0306197 | A1 | 10/2019 | Degioanni |
| 2019/0306282 | A1 | 10/2019 | Masputra et al. |
| 2019/0313278 | A1 | 10/2019 | Liu |
| 2019/0313907 | A1 | 10/2019 | Khachaturian et al. |
| 2019/0319847 | A1 | 10/2019 | Nahar et al. |
| 2019/0319881 | A1 | 10/2019 | Maskara et al. |
| 2019/0327109 | A1 | 10/2019 | Guichard et al. |
| 2019/0334786 | A1 | 10/2019 | Dutta et al. |
| 2019/0334813 | A1 | 10/2019 | Raj et al. |
| 2019/0334820 | A1 | 10/2019 | Zhao |
| 2019/0342201 | A1 | 11/2019 | Singh |
| 2019/0342219 | A1 | 11/2019 | Liu et al. |
| 2019/0356736 | A1 | 11/2019 | Narayanaswamy et al. |
| 2019/0364099 | A1 | 11/2019 | Thakkar et al. |
| 2019/0364456 | A1 | 11/2019 | Yu |
| 2019/0372888 | A1 | 12/2019 | Michael et al. |
| 2019/0372889 | A1 | 12/2019 | Michael et al. |
| 2019/0372890 | A1 | 12/2019 | Michael et al. |
| 2019/0394081 | A1 | 12/2019 | Tahhan et al. |
| 2020/0014609 | A1 | 1/2020 | Hockett et al. |
| 2020/0014615 | A1 | 1/2020 | Michael et al. |
| 2020/0014616 | A1 | 1/2020 | Michael et al. |
| 2020/0014661 | A1 | 1/2020 | Mayya et al. |
| 2020/0014663 | A1 | 1/2020 | Chen et al. |
| 2020/0021514 | A1 | 1/2020 | Michael et al. |
| 2020/0021515 | A1 | 1/2020 | Michael et al. |
| 2020/0036624 | A1 | 1/2020 | Michael et al. |
| 2020/0044943 | A1 | 2/2020 | Bor-Yaliniz et al. |
| 2020/0044969 | A1 | 2/2020 | Hao et al. |
| 2020/0059420 | A1 | 2/2020 | Abraham |
| 2020/0059457 | A1 | 2/2020 | Raza et al. |
| 2020/0059459 | A1 | 2/2020 | Abraham et al. |
| 2020/0067831 | A1 | 2/2020 | Spraggins et al. |
| 2020/0092207 | A1 | 3/2020 | Sipra et al. |
| 2020/0097327 | A1 | 3/2020 | Beyer et al. |
| 2020/0099625 | A1 | 3/2020 | Yigit et al. |
| 2020/0099659 | A1 | 3/2020 | Cometto et al. |
| 2020/0106696 | A1 | 4/2020 | Michael et al. |
| 2020/0106706 | A1 | 4/2020 | Mayya et al. |
| 2020/0119952 | A1 | 4/2020 | Mayya et al. |
| 2020/0127905 | A1 | 4/2020 | Mayya et al. |
| 2020/0127911 | A1 | 4/2020 | Gilson et al. |
| 2020/0153701 | A1 | 5/2020 | Mohan et al. |
| 2020/0153736 | A1 | 5/2020 | Liebherr et al. |
| 2020/0159661 | A1 | 5/2020 | Keymolen et al. |
| 2020/0162407 | A1 | 5/2020 | Tillotson |
| 2020/0169473 | A1 | 5/2020 | Rimar et al. |
| 2020/0177503 | A1 | 6/2020 | Hooda et al. |
| 2020/0177550 | A1 | 6/2020 | Valluri et al. |
| 2020/0177629 | A1 | 6/2020 | Hooda et al. |
| 2020/0186471 | A1 | 6/2020 | Shen et al. |
| 2020/0195557 | A1 | 6/2020 | Duan et al. |
| 2020/0204460 | A1 | 6/2020 | Schneider et al. |
| 2020/0213212 | A1 | 7/2020 | Dillon et al. |
| 2020/0213224 | A1 | 7/2020 | Cheng et al. |
| 2020/0218558 | A1 | 7/2020 | Sreenath et al. |
| 2020/0235990 | A1 | 7/2020 | Janakiraman et al. |
| 2020/0235999 | A1 | 7/2020 | Mayya et al. |
| 2020/0236046 | A1 | 7/2020 | Jain et al. |
| 2020/0241927 | A1 | 7/2020 | Yang et al. |
| 2020/0244721 | A1 | 7/2020 | S et al. |
| 2020/0252234 | A1 | 8/2020 | Ramamoorthi et al. |
| 2020/0252324 | A1 | 8/2020 | Charles et al. |
| 2020/0259700 | A1 | 8/2020 | Bhalla et al. |

(56) References Cited

U.S. PATENT DOCUMENTS

| | | | |
|---|---|---|---|
| 2020/0267184 | A1 | 8/2020 | Vera-Schockner |
| 2020/0267203 | A1 | 8/2020 | Jindal et al. |
| 2020/0280587 | A1 | 9/2020 | Janakiraman et al. |
| 2020/0287819 | A1 | 9/2020 | Theogaraj et al. |
| 2020/0287976 | A1 | 9/2020 | Theogaraj et al. |
| 2020/0296011 | A1 | 9/2020 | Jain et al. |
| 2020/0296026 | A1 | 9/2020 | Michael et al. |
| 2020/0301764 | A1 | 9/2020 | Thoresen et al. |
| 2020/0314006 | A1 | 10/2020 | Mackie et al. |
| 2020/0314614 | A1 | 10/2020 | Moustafa et al. |
| 2020/0322230 | A1 | 10/2020 | Natal et al. |
| 2020/0322287 | A1 | 10/2020 | Connor et al. |
| 2020/0336336 | A1 | 10/2020 | Sethi et al. |
| 2020/0344089 | A1 | 10/2020 | Motwani et al. |
| 2020/0344143 | A1 | 10/2020 | Faseela et al. |
| 2020/0344163 | A1 | 10/2020 | Gupta et al. |
| 2020/0351188 | A1 | 11/2020 | Arora et al. |
| 2020/0358878 | A1 | 11/2020 | Bansal et al. |
| 2020/0366530 | A1 | 11/2020 | Mukundan et al. |
| 2020/0366562 | A1 | 11/2020 | Mayya et al. |
| 2020/0382345 | A1 | 12/2020 | Zhao et al. |
| 2020/0382387 | A1 | 12/2020 | Pasupathy et al. |
| 2020/0403821 | A1 | 12/2020 | Dev et al. |
| 2020/0412483 | A1 | 12/2020 | Tan et al. |
| 2020/0412576 | A1 | 12/2020 | Kondapavuluru et al. |
| 2020/0413283 | A1 | 12/2020 | Shen et al. |
| 2021/0006482 | A1 | 1/2021 | Hwang et al. |
| 2021/0006490 | A1 | 1/2021 | Michael et al. |
| 2021/0021538 | A1 | 1/2021 | Meck et al. |
| 2021/0029019 | A1 | 1/2021 | Kottapalli |
| 2021/0029088 | A1 | 1/2021 | Mayya et al. |
| 2021/0036888 | A1 | 2/2021 | Makkalla et al. |
| 2021/0036987 | A1 | 2/2021 | Mishra et al. |
| 2021/0037159 | A1 | 2/2021 | Shimokawa |
| 2021/0049191 | A1 | 2/2021 | Masson et al. |
| 2021/0067372 | A1 | 3/2021 | Cidon et al. |
| 2021/0067373 | A1 | 3/2021 | Cidon et al. |
| 2021/0067374 | A1 | 3/2021 | Cidon et al. |
| 2021/0067375 | A1 | 3/2021 | Cidon et al. |
| 2021/0067407 | A1 | 3/2021 | Cidon et al. |
| 2021/0067427 | A1 | 3/2021 | Cidon et al. |
| 2021/0067442 | A1 | 3/2021 | Sundararajan et al. |
| 2021/0067461 | A1 | 3/2021 | Cidon et al. |
| 2021/0067464 | A1 | 3/2021 | Cidon et al. |
| 2021/0067467 | A1 | 3/2021 | Cidon et al. |
| 2021/0067468 | A1 | 3/2021 | Cidon et al. |
| 2021/0073001 | A1 | 3/2021 | Rogers et al. |
| 2021/0092062 | A1 | 3/2021 | Dhanabalan et al. |
| 2021/0099360 | A1 | 4/2021 | Parsons et al. |
| 2021/0105199 | A1 | 4/2021 | H et al. |
| 2021/0111998 | A1 | 4/2021 | Saavedra |
| 2021/0112034 | A1 | 4/2021 | Sundararajan et al. |
| 2021/0126830 | A1 | 4/2021 | R et al. |
| 2021/0126853 | A1 | 4/2021 | Ramaswamy et al. |
| 2021/0126854 | A1 | 4/2021 | Guo et al. |
| 2021/0126860 | A1 | 4/2021 | Ramaswamy et al. |
| 2021/0144091 | A1 | 5/2021 | H et al. |
| 2021/0160169 | A1 | 5/2021 | Shen et al. |
| 2021/0160813 | A1 | 5/2021 | Gupta et al. |
| 2021/0176255 | A1 | 6/2021 | Hill et al. |
| 2021/0184952 | A1 | 6/2021 | Mayya et al. |
| 2021/0184966 | A1 | 6/2021 | Ramaswamy et al. |
| 2021/0184983 | A1 | 6/2021 | Ramaswamy et al. |
| 2021/0194814 | A1 | 6/2021 | Roux et al. |
| 2021/0226880 | A1 | 7/2021 | Ramamoorthy et al. |
| 2021/0234728 | A1 | 7/2021 | Cidon et al. |
| 2021/0234775 | A1 | 7/2021 | Devadoss et al. |
| 2021/0234786 | A1 | 7/2021 | Devadoss et al. |
| 2021/0234804 | A1 | 7/2021 | Devadoss et al. |
| 2021/0234805 | A1 | 7/2021 | Devadoss et al. |
| 2021/0235312 | A1 | 7/2021 | Devadoss et al. |
| 2021/0235313 | A1 | 7/2021 | Devadoss et al. |
| 2021/0266262 | A1 | 8/2021 | Subramanian et al. |
| 2021/0279069 | A1 | 9/2021 | Salgaonkar et al. |
| 2021/0314289 | A1 | 10/2021 | Chandrashekhar et al. |
| 2021/0314385 | A1 | 10/2021 | Pande et al. |
| 2021/0328835 | A1 | 10/2021 | Mayya et al. |
| 2021/0336880 | A1 | 10/2021 | Gupta et al. |
| 2021/0377109 | A1 | 12/2021 | Shrivastava et al. |
| 2021/0377156 | A1 | 12/2021 | Michael et al. |
| 2021/0392060 | A1 | 12/2021 | Silva et al. |
| 2021/0392070 | A1 | 12/2021 | Tootaghaj et al. |
| 2021/0392171 | A1 | 12/2021 | Srinivas et al. |
| 2021/0392477 | A1 | 12/2021 | Taft et al. |
| 2021/0399920 | A1 | 12/2021 | Sundararajan et al. |
| 2021/0399978 | A9 | 12/2021 | Michael et al. |
| 2021/0400113 | A1 | 12/2021 | Markuze et al. |
| 2021/0400512 | A1 | 12/2021 | Agarwal et al. |
| 2021/0409277 | A1 | 12/2021 | Jeuk et al. |
| 2022/0006726 | A1 | 1/2022 | Michael et al. |
| 2022/0006751 | A1 | 1/2022 | Ramaswamy et al. |
| 2022/0006756 | A1 | 1/2022 | Ramaswamy et al. |
| 2022/0029902 | A1 | 1/2022 | Shemer et al. |
| 2022/0035673 | A1 | 2/2022 | Markuze et al. |
| 2022/0038370 | A1 | 2/2022 | Vasseur et al. |
| 2022/0038557 | A1 | 2/2022 | Markuze et al. |
| 2022/0045927 | A1 | 2/2022 | Liu et al. |
| 2022/0052928 | A1 | 2/2022 | Sundararajan et al. |
| 2022/0061059 | A1 | 2/2022 | Dunsmore et al. |
| 2022/0086035 | A1 | 3/2022 | Devaraj et al. |
| 2022/0094644 | A1 | 3/2022 | Cidon et al. |
| 2022/0123961 | A1 | 4/2022 | Mukundan et al. |
| 2022/0131740 | A1 | 4/2022 | Mayya et al. |
| 2022/0131807 | A1 | 4/2022 | Srinivas et al. |
| 2022/0131898 | A1 | 4/2022 | Hooda et al. |
| 2022/0141184 | A1 | 5/2022 | Oswal et al. |
| 2022/0158923 | A1 | 5/2022 | Ramaswamy et al. |
| 2022/0158924 | A1 | 5/2022 | Ramaswamy et al. |
| 2022/0158926 | A1 | 5/2022 | Wennerström et al. |
| 2022/0166713 | A1 | 5/2022 | Markuze et al. |
| 2022/0191719 | A1 | 6/2022 | Roy |
| 2022/0198229 | A1 | 6/2022 | López et al. |
| 2022/0210035 | A1 | 6/2022 | Hendrickson et al. |
| 2022/0210041 | A1 | 6/2022 | Gandhi et al. |
| 2022/0210042 | A1 | 6/2022 | Gandhi et al. |
| 2022/0210122 | A1 | 6/2022 | Levin et al. |
| 2022/0217015 | A1 | 7/2022 | Vuggrala et al. |
| 2022/0231949 | A1 | 7/2022 | Ramaswamy et al. |
| 2022/0231950 | A1 | 7/2022 | Ramaswamy et al. |
| 2022/0232411 | A1 | 7/2022 | Vijayakumar et al. |
| 2022/0239596 | A1 | 7/2022 | Kumar et al. |
| 2022/0294701 | A1 | 9/2022 | Mayya et al. |
| 2022/0335027 | A1 | 10/2022 | Seshadri et al. |
| 2022/0337553 | A1 | 10/2022 | Mayya et al. |
| 2022/0353152 | A1 | 11/2022 | Ramaswamy |
| 2022/0353171 | A1 | 11/2022 | Ramaswamy et al. |
| 2022/0353175 | A1 | 11/2022 | Ramaswamy et al. |
| 2022/0353182 | A1 | 11/2022 | Ramaswamy et al. |
| 2022/0353190 | A1 | 11/2022 | Ramaswamy et al. |
| 2022/0360500 | A1 | 11/2022 | Ramaswamy et al. |
| 2022/0407773 | A1 | 12/2022 | Kempanna et al. |
| 2022/0407774 | A1 | 12/2022 | Kempanna et al. |
| 2022/0407790 | A1 | 12/2022 | Kempanna et al. |
| 2022/0407820 | A1 | 12/2022 | Kempanna et al. |
| 2022/0407915 | A1 | 12/2022 | Kempanna et al. |
| 2023/0006929 | A1 | 1/2023 | Mayya et al. |
| 2023/0025586 | A1 | 1/2023 | Rolando et al. |
| 2023/0026330 | A1 | 1/2023 | Rolando et al. |
| 2023/0026865 | A1 | 1/2023 | Rolando et al. |
| 2023/0028872 | A1 | 1/2023 | Ramaswamy |
| 2023/0039869 | A1 | 2/2023 | Ramaswamy et al. |
| 2023/0041916 | A1 | 2/2023 | Zhang et al. |
| 2023/0054961 | A1 | 2/2023 | Ramaswamy et al. |
| 2023/0105680 | A1 | 4/2023 | Simlai et al. |
| 2023/0121871 | A1 | 4/2023 | Mayya et al. |
| 2023/0164158 | A1 | 5/2023 | Fellows et al. |
| 2023/0179445 | A1 | 6/2023 | Cidon et al. |
| 2023/0179502 | A1 | 6/2023 | Ramaswamy et al. |
| 2023/0179521 | A1 | 6/2023 | Markuze et al. |
| 2023/0179543 | A1 | 6/2023 | Cidon et al. |
| 2023/0216768 | A1 | 7/2023 | Zohar et al. |
| 2023/0216801 | A1 | 7/2023 | Markuze et al. |
| 2023/0216804 | A1 | 7/2023 | Zohar et al. |
| 2023/0221874 | A1 | 7/2023 | Markuze et al. |

(56) References Cited

U.S. PATENT DOCUMENTS

| | | | |
|---|---|---|---|
| 2023/0224356 | A1 | 7/2023 | Markuze et al. |
| 2023/0224759 | A1 | 7/2023 | Ramaswamy |
| 2023/0231845 | A1 | 7/2023 | Manoharan et al. |
| 2023/0239234 | A1 | 7/2023 | Zohar et al. |
| 2023/0261974 | A1 | 8/2023 | Ramaswamy et al. |
| 2023/0308421 | A1 | 9/2023 | Mayya et al. |
| 2023/0336431 | A1 | 10/2023 | Ramaswamy et al. |

FOREIGN PATENT DOCUMENTS

| | | | |
|---|---|---|---|
| CN | 102577270 | A | 7/2012 |
| CN | 102811165 | A | 12/2012 |
| CN | 104205757 | A | 12/2014 |
| CN | 104956329 | A | 9/2015 |
| CN | 106230650 | A | 12/2016 |
| CN | 106656847 | A | 5/2017 |
| CN | 106998284 | A | 8/2017 |
| CN | 110447209 | A | 11/2019 |
| CN | 111198764 | A | 5/2020 |
| EP | 1031224 | B1 | 3/2005 |
| EP | 1912381 | A1 | 4/2008 |
| EP | 2538637 | A2 | 12/2012 |
| EP | 2763362 | A1 | 8/2014 |
| EP | 3041178 | A1 | 7/2016 |
| EP | 3297211 | A1 | 3/2018 |
| EP | 3509256 | A1 | 7/2019 |
| EP | 3346650 | B1 | 11/2019 |
| JP | 2002368792 | A | 12/2002 |
| JP | 2010233126 | A | 10/2010 |
| JP | 2014200010 | A | 10/2014 |
| JP | 2017059991 | A | 3/2017 |
| JP | 2017524290 | A | 8/2017 |
| KR | 20170058201 | A | 5/2017 |
| RU | 2574350 | C2 | 2/2016 |
| WO | 2000078004 | A2 | 12/2000 |
| WO | 03073701 | A1 | 9/2003 |
| WO | 2005071861 | A1 | 8/2005 |
| WO | 2007016834 | A1 | 2/2007 |
| WO | 2012167184 | A2 | 12/2012 |
| WO | 2015092565 | A1 | 6/2015 |
| WO | 2016061546 | A1 | 4/2016 |
| WO | 2016123314 | A1 | 8/2016 |
| WO | 2017083975 | A1 | 5/2017 |
| WO | 2019070611 | A1 | 4/2019 |
| WO | 2019094522 | A1 | 5/2019 |
| WO | 2020012491 | A1 | 1/2020 |
| WO | 2020018704 | A1 | 1/2020 |
| WO | 2020091777 | A1 | 5/2020 |
| WO | 2020101922 | A1 | 5/2020 |
| WO | 2020112345 | A1 | 6/2020 |
| WO | 2020214173 | A1 | 10/2020 |
| WO | 2021040934 | A1 | 3/2021 |
| WO | 2021118717 | A1 | 6/2021 |
| WO | 2021150465 | A1 | 7/2021 |
| WO | 2021211906 | A1 | 10/2021 |
| WO | 2021242562 | A1 | 12/2021 |
| WO | 2022005607 | A1 | 1/2022 |
| WO | 2022082680 | A1 | 4/2022 |
| WO | 2022154850 | A1 | 7/2022 |
| WO | 2022159156 | A1 | 7/2022 |
| WO | 2022231668 | A1 | 11/2022 |
| WO | 2022235303 | A1 | 11/2022 |
| WO | 2022265681 | A1 | 12/2022 |
| WO | 2023009159 | A1 | 2/2023 |

OTHER PUBLICATIONS

Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.

Author Unknown, "VeloCloud Administration Guide: VMware SD-WAN by VeloCloud 3.3," Month Unknown 2019, 366 pages, VMware, Inc., Palo Alto, CA, USA.

Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.

Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.

Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.

Cox, Jacob H., et al., "Advancing Software-Defined Networks: A Survey," IEEE Access, Oct. 12, 2017, 40 bages, vol. 5, IEEE, retrieved from https://ieeexplore.ieee.org/document/8066287.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.

Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.

Funabiki, Nobuo, et al., "A Frame Aggregation Extension of Routing Algorithm for Wireless Mesh Networks," 2014 Second International Symposium on Computing and Networking, Dec. 10-12, 2014, 5 pages, IEEE, Shizuoka, Japan.

Guo, Xiangyi, et al., (U.S. Appl. No. 62/925,193), filed Oct. 23, 2019, 26 pages.

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.

Lasserre, Marc, et al., "Framework for Data Center (DC) Network Virtualization," RFC 7365, Oct. 2014, 26 pages, IETF.

Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.

Lin, Weidong, et al., "Using Path Label Routing in Wide Area Software-Defined Networks with Open Flow," 2016 International Conference on Networking and Network Applications, Jul. 2016, 6 pages, IEEE.

Long, Feng, "Research and Application of Cloud Storage Technology in University Information Service," Chinese Excellent Masters' Theses Full-text Database, Mar. 2013, 72 pages, China Academic Journals Electronic Publishing House, China.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

(56) References Cited

OTHER PUBLICATIONS

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.
Non-Published Commonly Owned U.S. Appl. No. 15/803,964, filed Nov. 6, 2017, 15 bages, The Mode Group.
Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.
Petition for Post-Grant Review of U.S. Pat. No. 9,722,815, filed May 1, 2018, 106 pages.
Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.
Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.
Taleb, Tarik, "D4.1 Mobile Network Cloud Component Design," Mobile Cloud Networking, Nov. 8, 2013, 210 bages, MobileCloud Networking Consortium, retrieved from http://www.mobile-cloud-networking.eu/site/index.php?process=download&id=127&code=89d30565cd2ce087d3f8e95f9ad683066510a61f.
Tootaghaj, Diman Zad, et al., "Homa: An Efficient Topology and Route Management Approach in SD-WAN Overlays," IEEE Infocom 2020—IEEE Conference on Computer Communications, Jul. 6-9, 2020, 10 pages, IEEE, Toronto, ON, Canada.
Valtulina, Luca, "Seamless Distributed Mobility Management (DMM) Solution in Cloud Based LTE Systems," Master Thesis, Nov. 2013, 168 pages, University of Twente, retrieved from http://essay.utwente.nl/64411/1/ Luca_Valtulina_MSc_Report_final.pdf.
Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.
Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.
Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.
Zakurdaev, Gieorgi, et al., "Dynamic On-Demand Virtual Extensible LAN Tunnels via Software-Defined Wide Area Networks," 2022 IEEE 12th Annual Computing and Communication Workshop and Conference, Jan. 26-29, 2022, 6 pages, IEEE, Las Vegas, NV, USA.

* cited by examiner

METHOD AND SYSTEM OF OVERLAY FLOW CONTROL

CLAIM OF BENEFIT TO PRIOR APPLICATIONS

This application is a continuation application of U.S. patent application Ser. No. 17/361,292, filed Jun. 28, 2021, now published as U.S. Patent Publication 2021/0328835. U.S. patent application Ser. No. 17/361,292 is a continuation application of U.S. patent application Ser. No. 16/656,555, filed Oct. 17, 2019, now issued as U.S. Pat. No. 11,050,588. U.S. patent application Ser. No. 16/656,555 is a continuation application of U.S. patent application Ser. No. 15/624,532, filed Jun. 15, 2017, now issued as U.S. Pat. No. 10,454,714. U.S. patent application Ser. No. 15/624,532 claims priority to U.S. Provisional Patent Application No. 62/457,816, filed Feb. 11, 2017. U.S. patent application Ser. No. 15/624,532 also claims priority to and is a continuation-in-part of U.S. patent application Ser. No. 14/321,818, filed Jul. 2, 2014, now issued as U.S. Pat. No. 9,722,815. U.S. patent application Ser. No. 14/321,818 claims priority to U.S. Provisional Patent Application 61/844,822, filed Jul. 10, 2013. U.S. patent application Ser. No. 17/361,292, now published as U.S. Patent Publication 2021/0328835, U.S. patent application Ser. No. 16/656,555, now issued as U.S. Pat. No. 11,050,588, U.S. patent application Ser. No. 15/624,532, now issued as U.S. Pat. No. 10,454,714, U.S. patent application Ser. No. 14/321,818, now issued as U.S. Pat. No. 9,722,815, and U.S. Provisional Patent Application 62/457, 816, are incorporated by reference in their entirety.

FIELD OF THE INVENTION

This application relates generally to computer networking, and more specifically to a system, article of manufacture and method of establishing and managing overlay flow control in a computer network.

DESCRIPTION OF THE RELATED ART

Employees working in branch offices of an Enterprises typically need to access resources that are located in another branch office. In some cases, these are located in the Enterprise Data Center, which is a central location for resources. Access to these resources is typically obtained by using a site-to-site VPN, which establishes a secure connection over a public network (e.g. the Internet, etc.). There may be dedicated computer equipment in the branch office, the other branch office and/or Data Center which establishes and maintains the secure connection. These types of site-to-site VPNs can be setup one at a time and can be resource intensive to set up and maintain.

BRIEF SUMMARY OF THE INVENTION

In one aspect, A computerized method of a gateway distributing routes learned through routing protocols (RP) into a Border Gateway Protocol (BGP) includes the step of providing a first gateway that receives a route over a routing protocol. The method includes the step of with the first gateway, redistributing the route to one or more peer routers as a BGP route based on one or more specified criteria. The method includes the step of setting a gateway precedence based on the redistribution of the route to the one or more peer routers as the BGP route. The method includes the step of, based on the gateway precedence, setting a second gateway to automatically redistribute the route with different priorities to influence steering of traffic to a preferred gateway.

Figure 1:
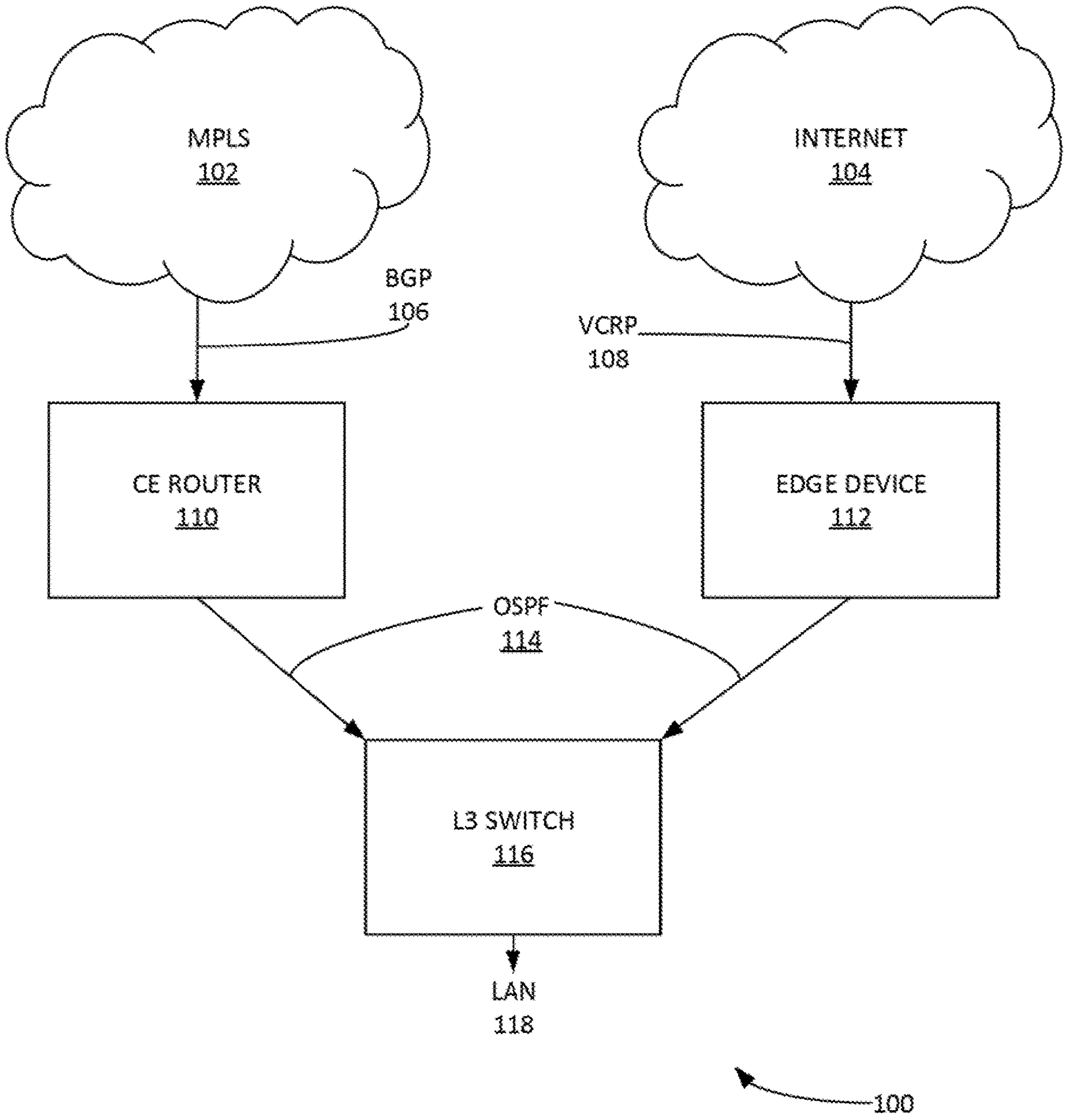
FIG. 1 illustrates an example network for implementing Overlay Flow Control, according to some embodiments.

The Figures described above are a representative set, and are not exhaustive with respect to embodying the invention.

DESCRIPTION

Disclosed are a system, method, and article of manufacture for overlay flow control. The following description is presented to enable a person of ordinary skill in the art to make and use the various embodiments Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example', or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner n one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth, in other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are nog provided.

Border Gateway Protocol (BGP) can be a standardized exterior gateway protocol designed to exchange routing and reachability information among autonomous systems (AS) on the Internet.

Cloud computing can involve deploying groups of remote servers and/or software networks that allow centralized data storage and online access to computer services or resources. These groups of remote serves and/or software networks can be a collection of remote computing services.

CE router (customer edge router) can be a router located on the customer premises that provides an Ethernet interface between the customer's LAN and, the provider's core network. CE routers can be a component in an MPLS architecture.

Customer-premises equipment (CPE) can be any terminal and associated equipment located at a subscriber's premises and connected with a carrier's telecommunication channel at the demarcation point.

Edge device can be a device that provides an entry point into enterprise or service provider core networks. An edge device can be software running in a virtual machine (VM) located in a branch office and/or customer premises.

Firewall can be a network security system that monitors and controls the incoming and outgoing network traffic based on predetermined security rules.

Flow can be a grouping of packets that match a five (5) tuple which is a combination of Source IP Address (SIP), Destination IP Address (DIP), L4 Source Port (SPORT) and L4 Destination Port (DPORT) and the L4 protocol (PROTO).

Forward error correction (FEC) (e.g. channel coding) can be a technique used for controlling errors in data transmission over unreliable or noisy communication channels.

Deep learning can be a type of machine learning based on a set of algorithms that attempt to model high-level abstractions in data by using model architectures, with complex structures or otherwise, composed of multiple non-linear transformations Deep Packet Inspection (DPI) can be the ability to analyze the different layers of a packet on the network.

Gateway can be a node (e.g. a router) on a con computer network that serves as an access point to another network.

Internet Protocol Security (IPsec) can be a protocol suite for securing Internet Protocol (IP) communications by authenticating and encrypting each IP packet of a communication session.

Multi-Exit Discriminator (MED) can be an attribute of the Border Gateway Protocol used to influence route preference.

Multiprotocol Label Switching (MPLS) can be a mechanism in telecommunications networks that directs data from one network node to the next based on short path labels rather than long network addresses, thus avoiding complex lookups in a routing table.

Orchestrator can include a software component that provides multi-tenant and role based centralized configuration management and visibility.

Open Shortest Path First (OSPF) can be a routing protocol for Internet Protocol (IP) networks. OSPF ca use a link state routing (LSR) algorithm and falls into the group of interior gateway protocols (IGPs), operating within a single autonomous system (AS).

Overlay Flow Control table can be a user interface on the Orchestrator which displays all routes in the customer and allows for editing routing attributes preferred exits, and default behaviors for future learned routes.

Quality of Service (QoS) can include the ability to define a guaranteed of actions such as routing, resource constraints (e.g. bandwidth, latency etc.).

Software as a service (SaaS) can be a software licensing and delivery model in which software is licensed on a subscription basis and is centrally hosted.

Tunneling protocol can allow a network user to access or provide a network service that the underlying network does not support or provide directly.

Virtual Desktop Infrastructure (VDI) is a desktop-oriented service that hosts user desktop environments on remote servers and/or blade PCs. Users access the desktops over a network using a remote display protocol.

Virtual private network (VPN) can extend a private network across a public network, such as the Internet. It can enable users to send and receive data across shared or public networks as if their computing devices were directly connected to the private network, and thus benefit from the functionality, security and management policies of the private network.

Voice over IP (VoIP) can a methodology and group of technologies for the delivery of voice communications and multimedia sessions over Internet Protocol (IP) networks, such as the Internet.

Additional example definitions are provided herein.

Examples Systems and Processes of Overlay Flow Control

In order to integrate into customer environments with minimal configuration required on existing devices, an Edge device and a gateway system can support dynamic routing protocols. In order to facilitate simplified use and management of these dynamic routing protocols such as OSPF. Accordingly, various Overlay Flow Control methods and system can be implemented. These can provide a user a single, simple point of configuration for all routes in a network without requiring changes to the protocol configuration itself.

FIG. 1 illustrates an example network 100 for implementing Overlay Flow Control, according to some embodiments. Network 100 provides an example topology with a single L3 switch 116 that is connected on the LAN 118 side of an edge device 112 (e.g. a Velocloud® edge device, etc.). L3 switch 116 can also be connected to a CE router 110. CE router 110 can redistribute an MPLS 102 and/or BGP 106 routes into OSPF 114 routes. In this topology, the edge device can learn routes from the L3 switch 116. Edge device 112 can inject its own routes as well. Network 100 can be communicatively coupled with the Internet 104 utilizing routing protocol 108 (e.g. Velocloud® routing protocol (VCRP), etc.). CE router 110 can be a customer-edge (CE) router. It is noted that in some examples, BGP can prefer routes with the shortest AS-path. The AS-path-prepend adds the AS number to the beginning of the AS path to make a shorter path appear longer and therefore less preferable.

Figure 2:
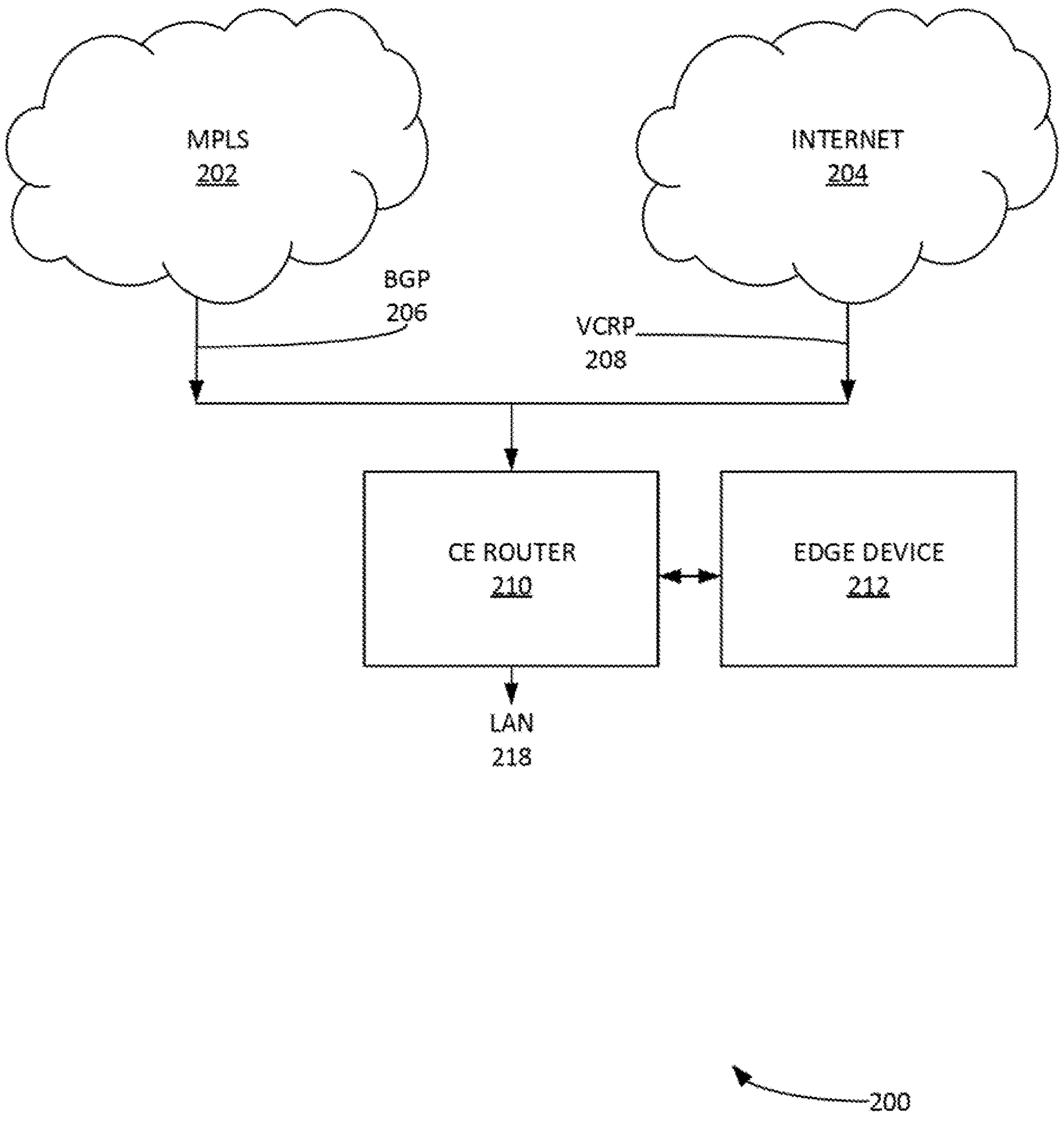
FIG. 2 illustrates another example network for implementing Overlay Flow Control, according to some embodiments.

FIG. 2 illustrates another example network 200 for implementing Overlay Flow Control, according to some embodiments. Network 100 provides an example topology where the Internet 204 and MPLS 202 links both terminate on a single router 210. Edge device 212 can be deployed in a 'one-arm' configuration attached to CE router 210. The edge device can redistribute an MPLS 102 and/or BGP 106 routes into OSPF 114 routes. In this topology, edge device 212 can learn routes from the L3 switch 116. In this example topology, edge device 212 can learn routes from the CE router 210, as well as injecting its own routes.

Figure 3:
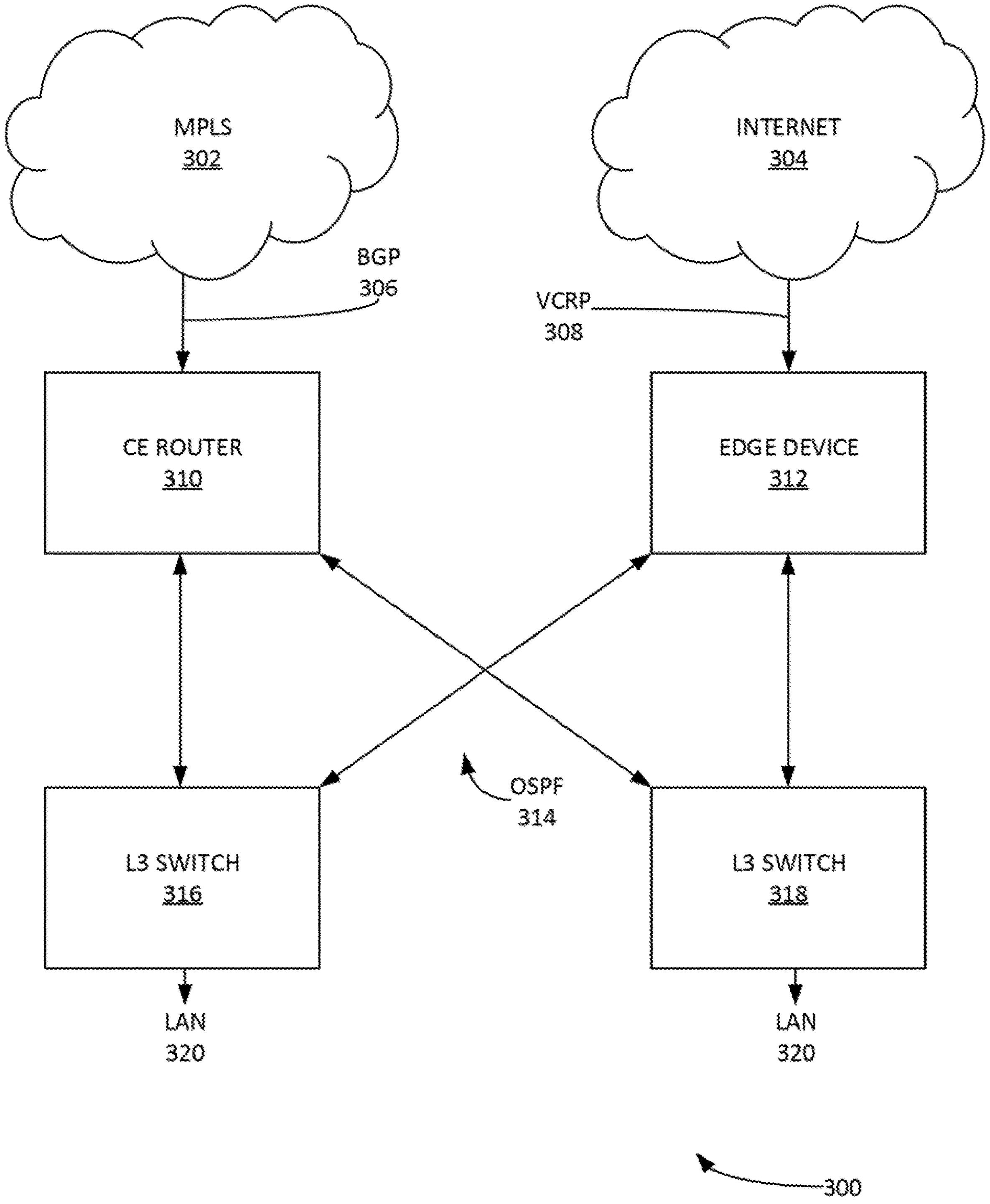
FIG. 3 illustrates another example network for implementing Overlay Flow Control, according to some embodiments.

FIG. 3 illustrates another example network 300 for implementing Overlay Flow Control, according to some embodiments. In an example large branch site, an active/active L3 switches 316-318 can communicate routes using OSPF 314 between two upstream devices (e.g. an Edge device) using OSPF 314 and a CE router 310. CE router 310 redistribute MPLS BGP routes 302, 306 into OSPF routes 314. It is noted that network 300 includes the notion of a single WAN link (e.g. MPLS) is accessible via two routed interfaces. In order to support this, a virtual IP address can be provisioned inside the edge and used in OSPF advertisement.

Figure 4:
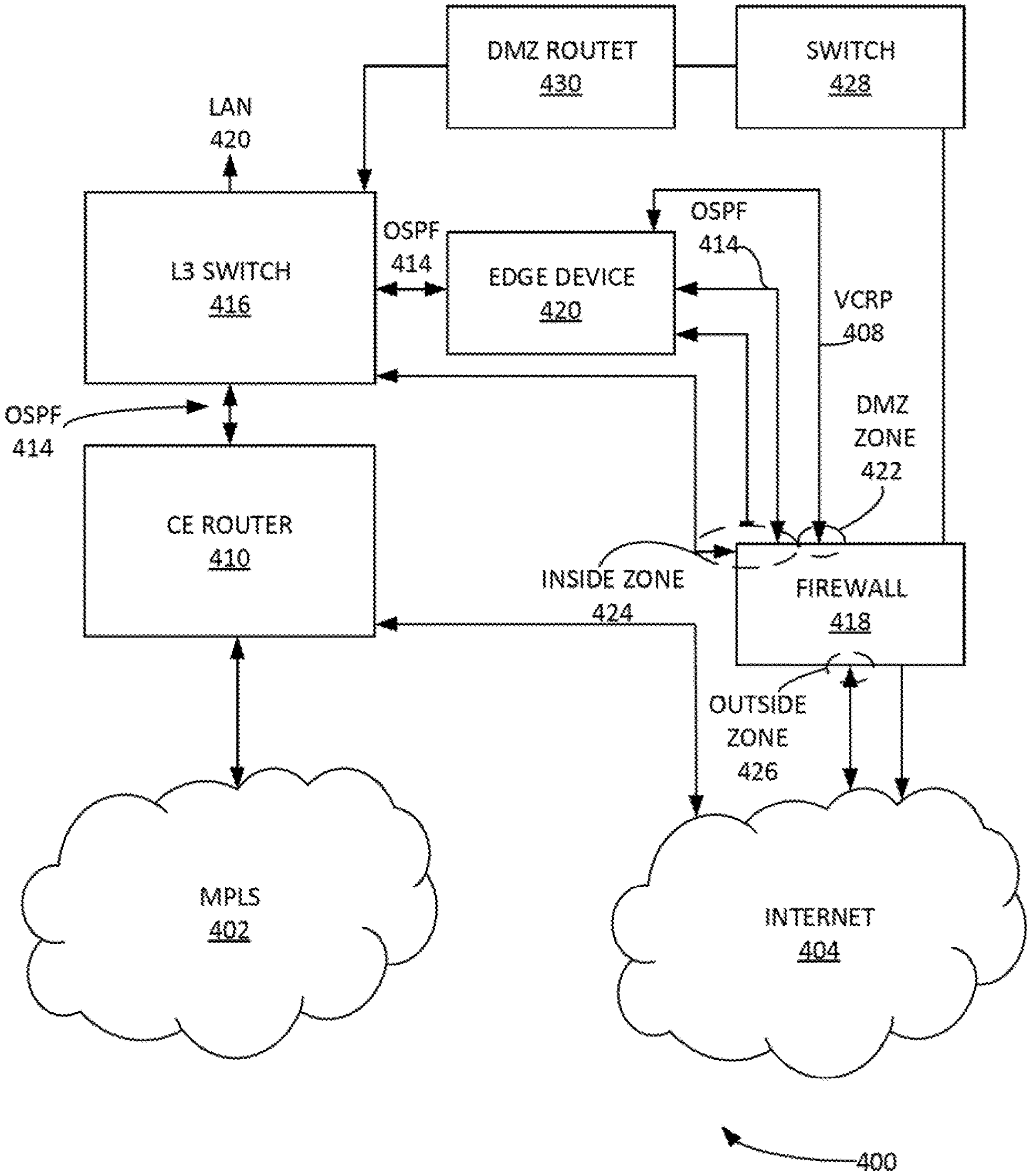
FIG. 4 illustrates another example network for implementing Overlay Flow Control, according to some embodiments.

FIG. 4 illustrates another example network 400 for implementing Overlay Flow Control, according to some embodiments. Network 400 can implement Overlay Flow Control in a datacenter site. A datacenter can have a distinct separation between the MPLS core and DMZ switch. The L3 switch can be talking OSPF and can be used for route learning and injection. The firewall within the DMZ can use routes injected via OSPF (though none may be learned) to ensure that returning Internet traffic is routed symmetrically.

Figure 5A:
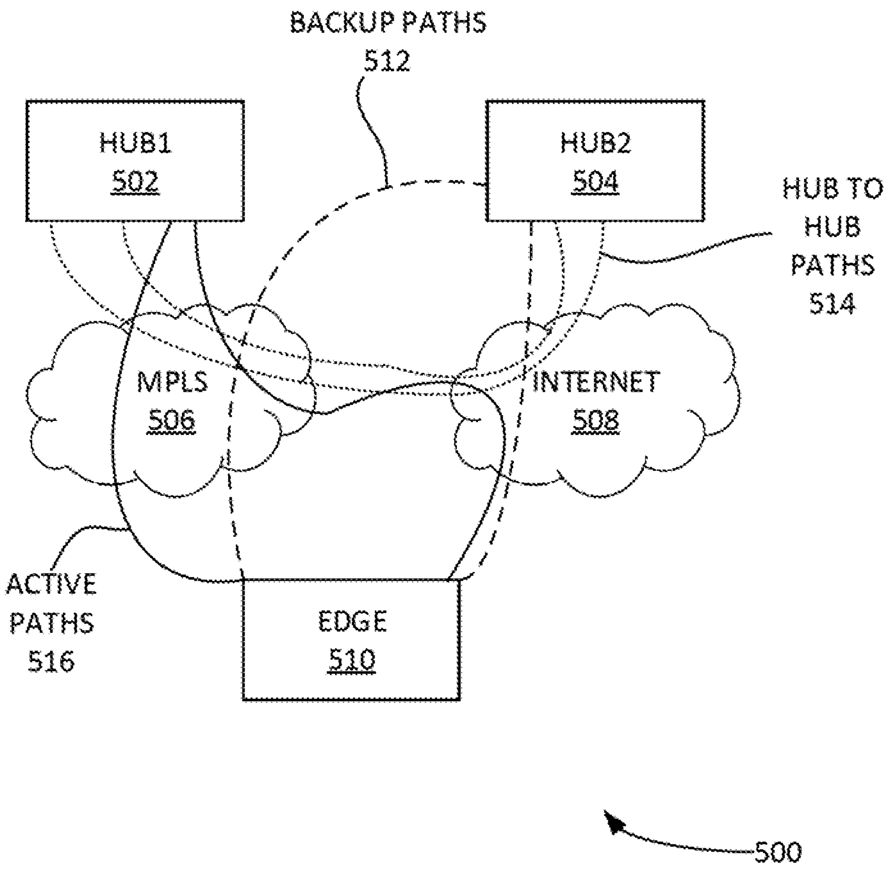
FIGS. 5A-B illustrate an example topology of two data centers can be configured as edge-to-edge VPN hubs, according to some embodiments.
Figure 5B:
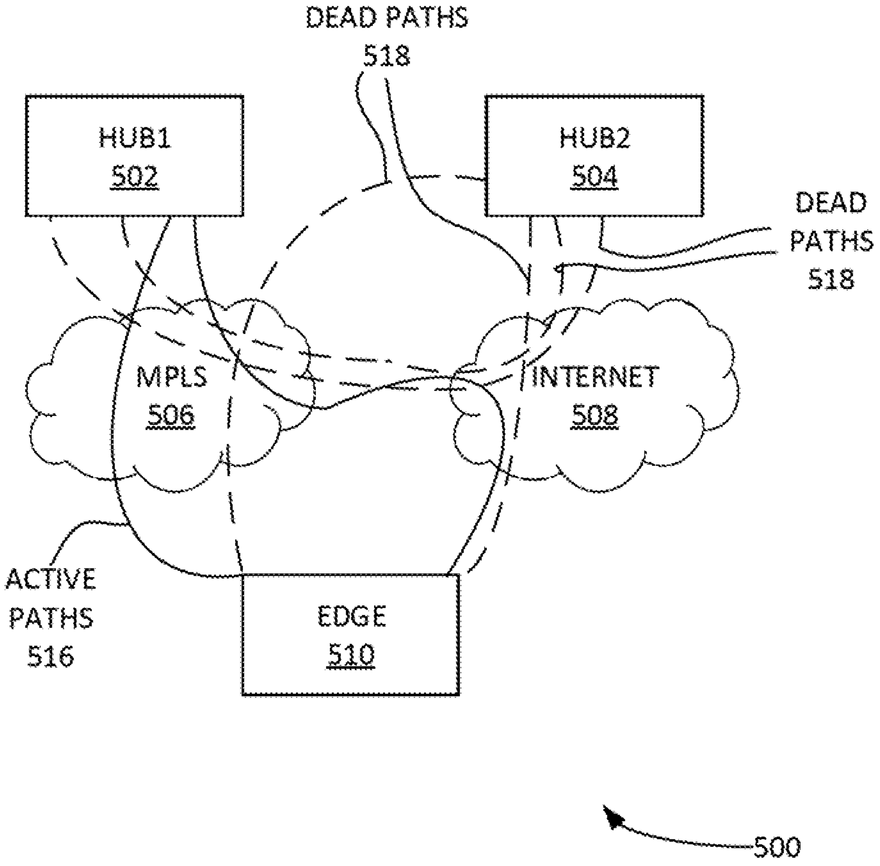

FIGS. 5A-B illustrate an example topology 500 of two data centers can be configured as edge-to-edge VPN hubs, according to some embodiments. Example topology 500 can include redundant data centers which advertise the same subnets with different costs. In this scenario, both data centers (e.g. a primary datacenter and a backup datacenter, etc.) can be configured as edge-to-edge VPN hubs 502 and 504. As all edges connect directly to each hub 502 and 504 (e.g. via MPLS 506 and/or Internet 508) using paths 516, hubs 502 and 504 can also connect directly to each other using paths 514. Based on a route cost value, network traffic can be steered to the preferred active datacenter.

The customer can indicate whether routes are preferred (e.g. VeloCloud® Overlay becomes the default path with MPLS 506 as a backup) and/or non-preferred (e.g. where MPLS 506 remains the default path with VeloCloud® Overlay as a backup). The route costs for preferred, non-preferred and/or default routes can be configurable. For example, they can have different defaults based on whether OE1 or OE2 routes are used in the redistribution.

In one example, a CE Router can advertise an OE2 route. For routes with cost 'n' (where 'n>1'), it can be advertised with cost 'n−1'. For routes with cost '1', it can be advertised with cost '1' and a link cost 'm−1', where 'm' is the link cost from the L3 Switch/Router to the CE router.

In another example, CE Router advertises an OE1 route. Take the OE1 route cost as 'n'. The link cost can be obtained from the L3 Switch/Router to the CE router as 'm'. It can be advertised a route with cost 'n-prime' and link cost 'm-prime' such that ('n-prime'+'m-prime')<('n+m').

Figure 6A:
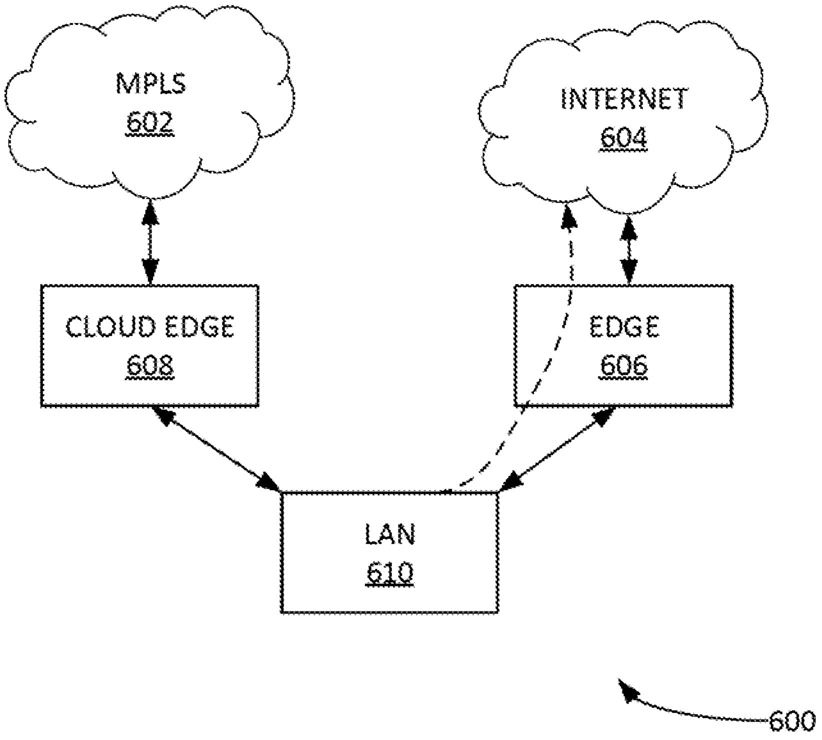
FIGS. 6A-B illustrate example failover behaviors for preferred and non-preferred routes, according to some embodiments.
Figure 6B:
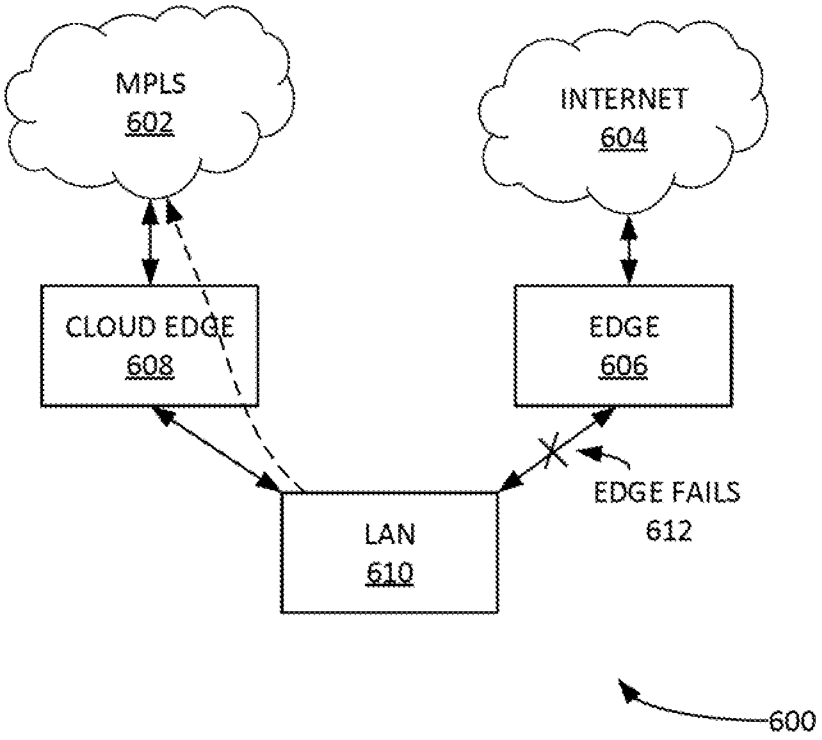
Figure 7A:
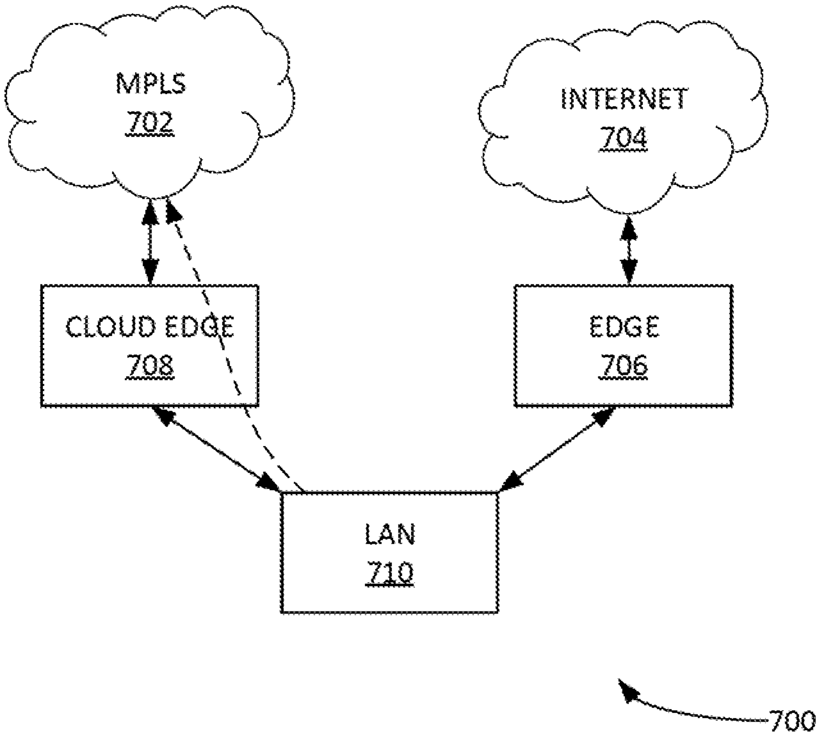
FIGS. 7A-B illustrate example failover behaviors for preferred and non-preferred routes, according to some embodiments.
Figure 7B:
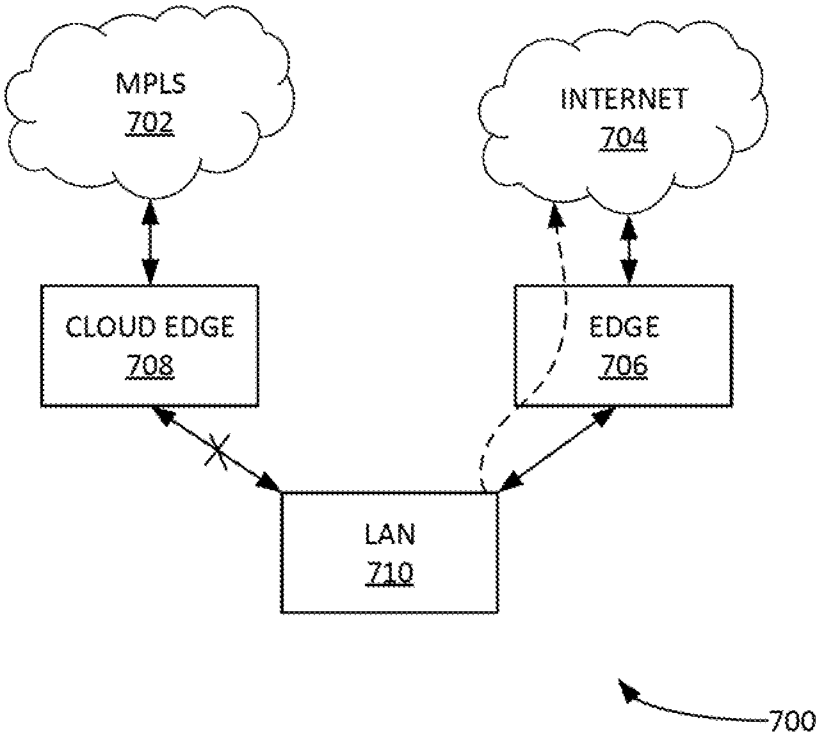

FIGS. 6A-B illustrate example failover behaviors for preferred and non-preferred routes, according to some embodiments. FIGS. 7A-B illustrate example failover behaviors for preferred and non-preferred routes, according to some embodiments.

It is noted that though route costs can be calculated for preferred and none preferred routes (e.g. as provided supra), for simplicity they are presented below as 'n' for CE router cost, 'n−1' for a preferred route cost and 'n+1' for a non-preferred route cost.

Figure 9:
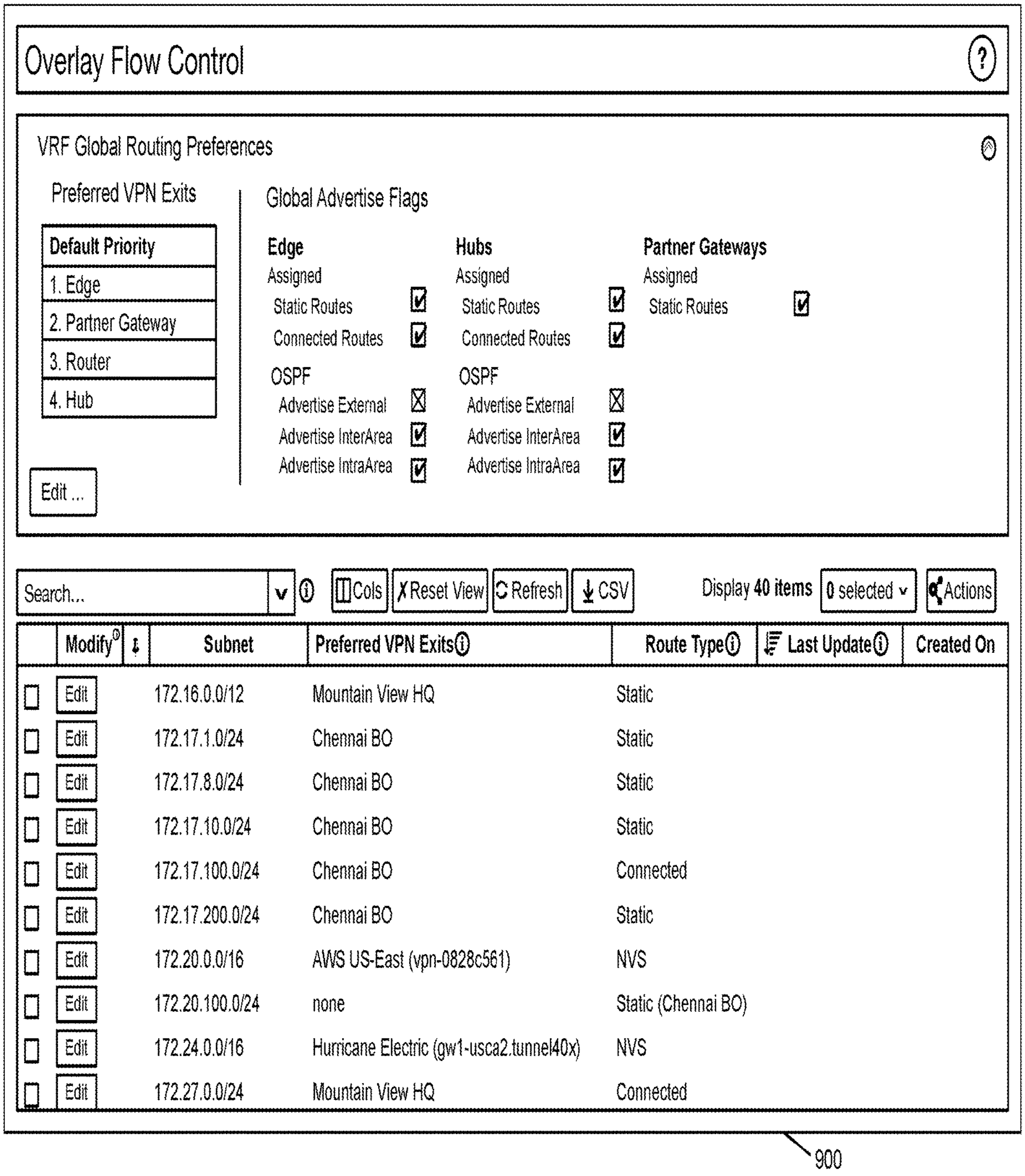
FIG. 9 illustrates an example screen shot of an Overlay Flow Control table, according to some embodiments.

To simplify the visualization and management of routes, they can be presented in an Overlay Flow Control table (e.g. see FIG. 9 infra). This table provides an enterprise-wide view of routes, routing adjacencies and preferred exits for each specific route. The preferred exit for any given route can be selected which can result in the routing preferences being automatically updated at each Edge device and advertised to influence routing changes across the network without the customer having to perform any further configuration actions. An edge device can implement the following rules for redistributing VCRP into OSPF. First, an edge device can redistribute VCRP prefixes that belong to various bronze sites as OE1, metric <m> if VCRP route preference is lower than DIRECT (if available) route preference. Else the prefixes are redistributed as OE2, metric <m> where m=low priority. A Direct route preference can be fixed to two-hundred and fifty-six (256). A VCRP route preference lower than 256 can indicate a route as a preferred route otherwise a Direct rout (if available) is preferred. The system can watch out for how CPE's redistribute this prefix into the MPLS cloud. The system can determine if the metric type is preserved by BGP attributes while redistributing into OSPF. The system can determine if the cost is preserved by BGP attributes while redistributing into OSPF.

Route insertion rules can be implemented. Routes can be inserted into a unified routing table based on the type of VPN profile configured. Hubs can setup direct routes for all VCRP prefixes. Branches can setup direct routes for prefixes via CG and/or VPN-hubs and/or DE2E direct route. For the same prefix, there can be two routes per transit point. This can be because the prefix is advertised by the owner and the hub. A first route can have a next_hop logical ID as transit point and destination logical ID as the owner. A next route can have a next hop logical ID and/or destination logical ID as VPN hub (e.g. not applicable for CG and DE2E).

A first example use case can include provisioning an edge device inside datacenter location that previously did not contain one. In this example, Hub1 can be inserted into the Datacenter site as shown in the picture with a routed interface connected to L3 switch and the other WAN link connected to the Internet. The leg connecting L3 switch and Hub1 can have OSPF enabled. Hub1 can advertise default route 0.0.0.0/0 (originate-default) with metric 0 to L3 switch. This can allow Hub1 to take over Internet traffic sourced by subnets connected to L3 switch. Route H can have been learned as intra-area route (O). Route ‘S’ can have been learned as external type route (e.g. OEx). Route H and Route S can be added to OSPF view and are sent to VCO for GNDT sync up. Hub1 can be marked as owner of prefix ‘H’ and VCO responds to Hub1 with advertise flag set to True for prefix ‘H’. Sites that advertise intra-area (O) or inter-area (IA) routes can be marked as owner of the routes in GNDT and can be allowed to advertise the routes to VCG. VCO can respond to Hub1 with advertise flag set to False for prefix ‘S’ as ‘S’ is an external-route and requires administrator’s intervention. Hub1 can advertises route ‘H’ to VCG through VCRP.

In a second use-case example, a Bronze site can be brought online. It is noted that the as a prerequisite, the Datacenter are already be online. A Bronze1 site (e.g. a simple branch office site with only Internet connections and no MPLS or dynamic routing protocols such as OSPF in use at the site) can be provisioned and connected to VCG through an Internet link. Bronze1 site can advertise route ‘B’ to VCG through VCRP. VCG can be a reflector that reflects route ‘B’ to Hub1 with Bronze1 site as next hop and can reflect route ‘H’ to Bronze1 site with Hub1 site as next hop.

In a third use-case example, a Silver site (e.g. a branch office site containing a hybrid of MPLS and Internet WAN links as well as an L3 device which is learning and advertising routes via OSPF) can be brought online. It is noted that the as a prerequisite, the Datacenter and associated Bronze site are already be online. Silver1 site can be stood up and connected to VCG through an Internet link. Silver1 site can learn routes ‘H’ and ‘B’ through VCG and install the learned sites into a unified route table. For example, Silver1 site can learn routes ‘S’ as an intra-area and routes ‘H’ and ‘B’ as external routes (e.g. from L3 switch). Routes ‘S’, ‘H’, and ‘B’ can be added to OSPF View and are communicated to VCO for GNDT synchronization. VCO responds with advertise flag set to ‘True’ for prefix ‘S’ but set to False for prefix ‘H’ and ‘B’. Silver1 can advertise ‘S’ to other branches via VCG over VCRP.

In a fourth use-case example, a Legacy site route advertisement can be implemented. It is noted that the as a prerequisite, the Datacenter and associated Bronze and Silver sites are already online. Legacy site route ‘L’ can be learned by Hub1 site and Silver1 site as external route (e.g. OEx). Hub1 and Silver1 can communicate route ‘L’ to VCO for GNDT synchronization. Hub1 can be chosen as owner for the external route ‘L’. (e.g. without administrator intervention). Hub1 can advertise route ‘L’ to other branches via VCG over VCRP, This can enable connectivity between legacy site ‘L’ and bronze1 site ‘B’.

Various examples of hybrid sites distributing routes learned through VCRP into OSPF are now discussed. In a first example, a hybrid site on <receiving route ‘R’ over VCRP can redistribute to L3 switch as external route based on various criteria, VeloCloud (B2B) can be set as preferred. Route ‘R’ can be revoked if it was installed with metric type OE2. Route ‘R’ can be redistributed with metric type OE1, metric ‘M’=1; etc. Accordingly, the L3 switch can be programmed with route ‘R’ pointing to an edge device (e.g. a Velocloud® edge, etc.). Additionally, OE1 can provide the adjacent routers to add cost to route ‘R’ as the routes get redistributed further and thus may not impact the route priority for this route ‘R’ on other receiving sites. In one example, Silver1 can install route ‘R’ with metric 1, metric type OE1. This route ‘R’ can be installed as the high priority route on adjacent L3 router(s). However, when this route ‘R’ reaches another hybrid site. For example, Datacenter site can see that the route ‘R’ with metric>one (1). Accordingly this does not affect the route ‘R’ on adjacent L3 routers f Datacenter site that can be pointing to Datacenter site as next hop.

A Direct criterion can be set as preferred when it is, available. In one example, route ‘R’ can be revoked if it was installed, with metric type OE1, metric ‘M’=one (1). Route ‘R’ can be redistributed with metric type OE2, metric ‘M’=cost of ‘R’<low_prio_offset>. <low_prio_offset> can be some value that installs the route as low priority route. The value can be updated based on lab experiment.

Hybrid site redistributing ‘R’ to L3 switch can enable connectivity between ‘R’ and ‘B’ over VeloCloud® B2B overlay. The VeloCloud® B2B Overlay is the VeloCloud® Edge and Gateway multipath system that was defined in the original patent providing multipath VPN connectivity between sites. Additionally, it allows connectivity between legacy sites ‘L’ and ‘B’ over private links and Velocloud B2B overlay.

Various examples of a gateway (e.g. a VeloCloud® Gateway, etc.) distributing routes learned through a routing protocol (e.g. VCRP) into BGP are now discussed. In a first example, a gateway receiving route ‘R’ over VCRP can redistribute ‘R’ to the adjacent L3 router(s) as a BGP route based on various criteria. Based on the gateway precedence, different gateway(s) can automatically redistribute with different priorities to influence steering of traffic to the preferred gateway. In one example, gateway 1 can redistribute route ‘R’ with MED 10 and gateway 2 can redistribute route ‘R’ with MED 20. In another example, a less preferred gateway 2 can send ‘R’ with automatic AS-path-prepend to effectively make gateway 1 preferred. In another example, the user may specify BGP communities in a priority-order (e.g. based on their mapping to local-preference on the provider-edge (PE) router side (e.g. a provider-edge router can be a version of a CE router that sits on the provider’s edge instead of the customer’s edge, etc.). Gateway 1 can then automatically redistribute route ‘R’ with a community value from this ordered list which is more preferred than the community value chosen on the route redistributed by gateway 2.

To facilitate ease of deployment of transit and non-transit edges (and/or to better categorize routes which are not local to an edge (e.g. routes learned from a separate autonomous system e.g. MPLS)), a new concept Uplink can be provided/implemented. A user may tag routes as Uplink for OFC driven preference/filtering purposes. In one example, user marks a BGP neighbor as Uplink and all routes learnt from this peer are tagged as Uplink (e.g. when replacing MPLS Customer Edge Router with a VeloCloud® Edge, etc.). In another example, the user can set a specific community value for routes not local to the Edge and configures that community value on the Edge BGP config as Uplink Community. Then any BGP learned route that has that community value, can be considered Uplink route. The OFC then provides global configuration options for Uplink routes that the user can use to easily control route propagation without manipulating routes individually.

Additional Exemplary Computer Architecture and Systems

Figure 8:
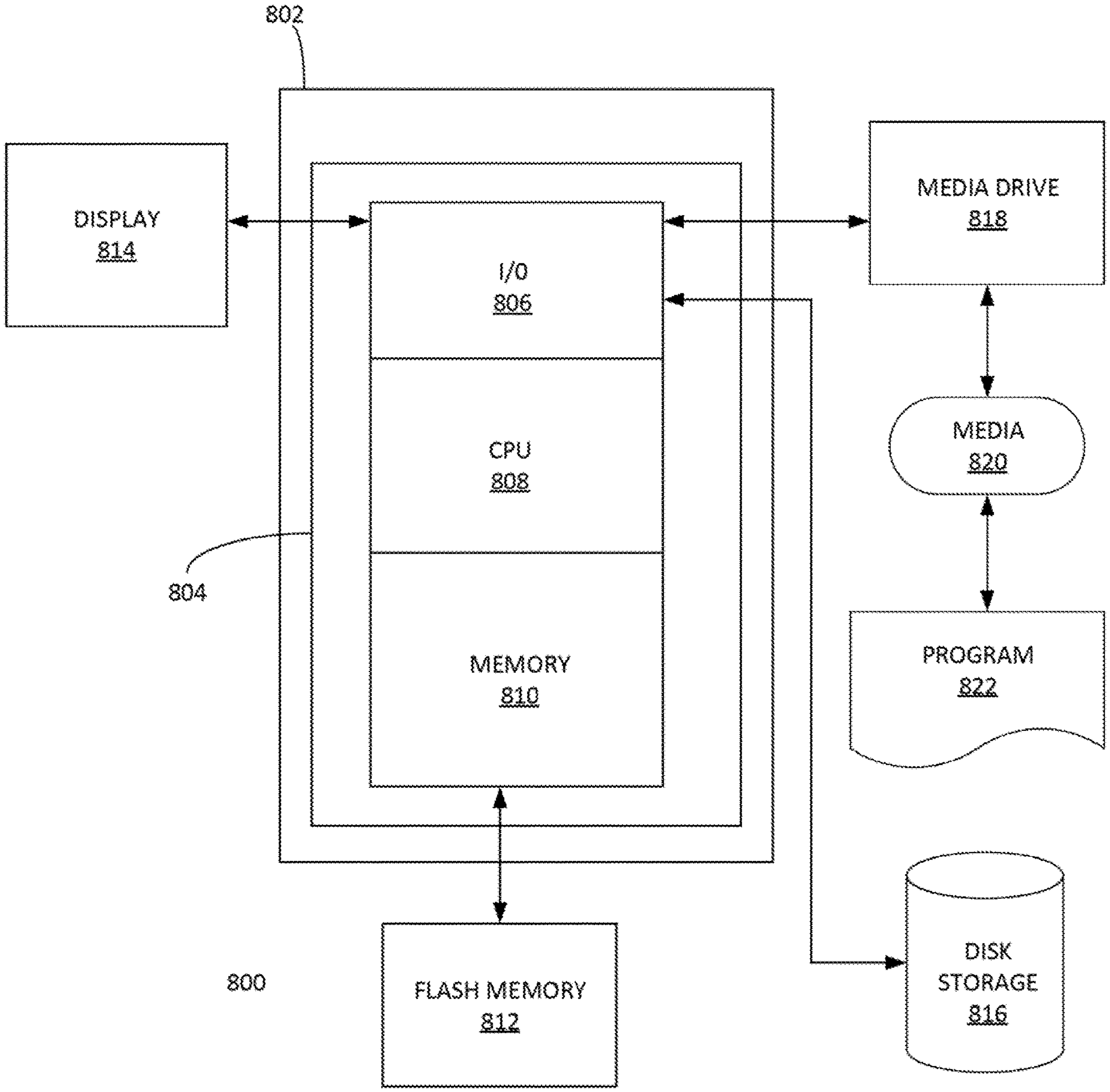
FIG. 8 depicts an exemplary computing system that can be configured to perform any one of the processes provided herein.

FIG. 8 depicts an exemplary computing system 800 that can be configured to perform any one of the processes provided herein. In this context, computing system 800 may include, for example, a processor, memory, storage, and I/O device (e.g., monitor, keyboard, disk drive, Internet connection, etc.). However, computing system 800 may include circuitry or other specialized hardware for carrying out some or all aspects of the processes. In some operational settings, computing system 800 may be configured as a system that includes one or more units, each of which is configured to carry out some aspects of the processes either in software, hardware, or some combination thereof.

FIG. 8 depicts computing system 800 with a number of components that may be used to perform any of the processes described herein. The main system 802 includes a motherboard 804 having an I/O section 806, one or more central processing units (CPU) 808, and a memory section 810, which may have a flash memory card 812 related to it. The I/O section 806 can be connected to a display 814, a keyboard and/or other user input (not shown), a disk storage unit 816, and a media drive unit 818. The media drive unit 818 can read/write a computer-readable medium 820, which can contain programs 822 and/or data. Computing system 800 can include a web browser. Moreover, it is noted that computing system 800 can be configured to include additional systems in order to fulfill various functionalities. Computing system 800 can communicate with other computing devices based on various computer communication protocols such a Wi-Fi, Bluetooth (and/or other standards for exchanging data over short distances includes those using short-wavelength radio transmissions), USB, Ethernet, cellular, an ultrasonic local area communication protocol, etc.

FIG. 9 illustrates an example screen shot 900 of an Overlay Flow Control table, according to some embodiments. Overlay Flow Control table can be a user interface on the Orchestrator. Screen shot 900 displays all routes in the customer system. Overlay Flow Control table allows for editing routing attributes, preferred exits, and default behaviors for future learned routes.

Figure 10:
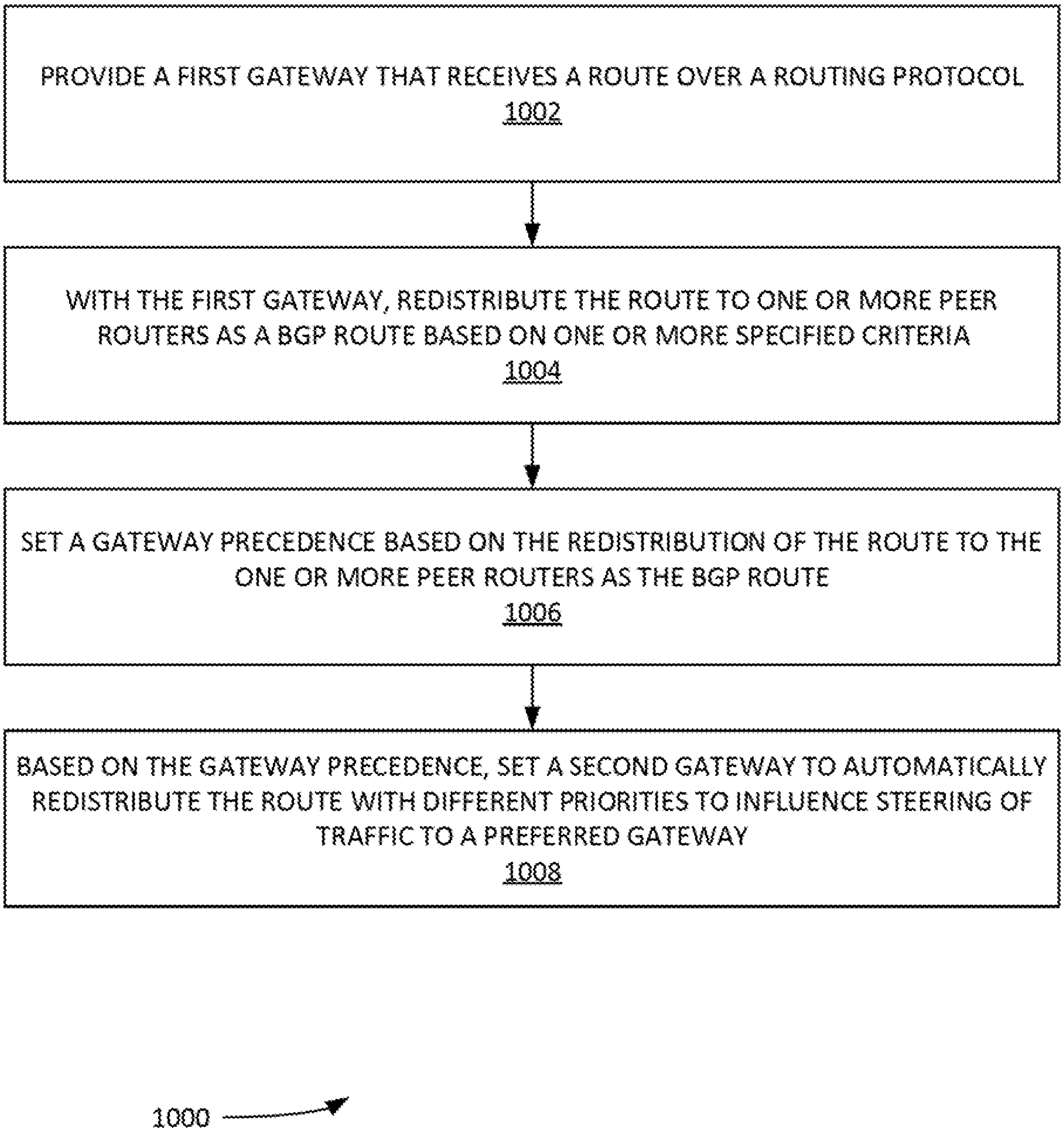
FIG. 10 illustrates an example process for overlay flow control, according to some embodiments.

FIG. 10 illustrates an example process 1000 for overlay flow control, according to some embodiments. In step 1002, process 1000 can provide a first gateway that receives a route over a routing protocol. In step 1004, process 1000 can, with the first gateway, redistribute the route to one or more peer routers as a BGP route based on one or more specified criteria. In step 1006, process 1000 can set a gateway precedence based on the redistribution of the route to the one or more peer routers as the BGP route. In step 1008, process 1000 can, based on the gateway precedence, set a second gateway to automatically redistribute the route with different priorities to influence steering of traffic to a preferred gateway. A peer router can be a router configured to be a peer to an edge router (e.g. a VeloCloud® edge, etc.) on a LAN. For example, a peer router can be an adjacent peer routers layer three (L3) router. It is noted that an edge device can be utilized in lieu of and/or as a gateway in some embodiments. For example, an edge device can redistribute the route as a BGP route or an OSPF (Open Shortest Path First) route.

Conclusion

Although the present embodiments have been described with reference to specific example embodiments, various modifications and changes, can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method for distributing routes among first and second routers of a first site comprising a first-site network and connected to one or more other sites through a wide area network (WAN), the method comprising:

at a first edge router that uses a first WAN link that is a multiprotocol label switching (MPLS) link to connect the first site to a second site through the WAN:
- receiving a set of border gateway protocol (BGP) routes for an MPLS network accessed through the MPLS link; and
- using an open shortest path first (OSPF) protocol to distribute the set of BGP routes to a second edge router that uses a second WAN link to connect the first site to the second site through the WAN,
- wherein the second edge router connects the first-site network to a public network, and
- wherein the sel of BGP routes is a first set of routes based on a first BGP routing protocol; and
- receiving, from the second edge router, a second set of routes based on a second routing protocol for the public network accessed through the second WAN link.

2. The method of claim 1, wherein using the OSPF protocol comprises using the OSPF protocol to distribute the set of BGP routes to the second edge router through a set of one or more switches of the network for the set of switches to use to communicate with the first edge router.

3. The method of claim 1, wherein the first site network is a first local area network of the first site, and the second site comprises a second LAN network that connects to the first LAN through the WAN to which the first and second edge routers of the first site connect.

4. The method of claim 1, wherein the second edge router uses the OSPF protocol to distribute the second set of routes to the first edge router.

5. The method of claim 4, wherein the second set of routes is received from the second edge router for the first edge router to learn routes to the public network.

6. The method of claim 1, wherein the set of BGP routes is provided to the second edge router for the second edge router to learn routes to the MPLS network.

7. A non-transitory machine readable medium storing a program for execution by a set of processing units, the program for distributing routes among first and second routers of a first site comprising a first-site network and connected to one or more other sites through a wide area network (WAN), the program comprising sets of instructions for:

at a first edge router that uses a first WAN link that is a multiprotocol label switching (MPLS) link to connect the first site to a second site through the WAN:
- receiving a set of border gateway protocol (BGP) routes for an MPLS network accessed through the MPLS link; and
- using an open shortest path first (OSPF) protocol to distribute the set of BGP routes to a second edge router that uses a second WAN link to connect the first site to the second site through the WAN,
- wherein the second edge router connects the first-site network to a public network, and wherein the set of BGP routes is a first set of routes based on a first BGP routing protocol; and receiving, from the second edge router, a second set of routes based on a second routing protocol for the public network accessed through the second WAN link.

8. The non-transitory machine readable medium of claim 7, wherein the set of instructions for using the OSPF protocol comprises a set of instructions for using the OSPF protocol to distribute the set of BGP routes to the second edge router through a set of one or more switches of the network for the set of switches to use to communicate with the first edge router.

9. The non-transitory machine readable medium of claim 7, wherein the first site network is a first local area network of the first site, and the second site comprises a second LAN network that connects to the first LAN through the WAN to which the first and second edge routers of the first site connect.

10. The non-transitory machine readable medium of claim 7, wherein the second edge router uses the OSPF protocol to distribute the second set of routes to the first edge router.

11. The non-transitory machine readable medium of claim 10, wherein the second set of routes is received from the second edge router for the first edge router to learn routes to the public network.

12. The non-transitory machine readable medium of claim 7, wherein the set of BGP routes is provided to the second edge router for the second edge router to learn routes to the MPLS network.

* * * * *